United States Patent

Bush et al.

[11] Patent Number: 5,535,135
[45] Date of Patent: Jul. 9, 1996

[54] STATE ESTIMATOR BASED EXHAUST GAS CHEMISTRY MEASUREMENT SYSTEM AND METHOD

[75] Inventors: Kevin J. Bush, Northville; Sanjay Dua, Troy; Neil J. Adams, Novi; Craig R. Markyvech, Romulus, all of Mich.

[73] Assignee: Motorola, Inc., Schaumburg, Ill.

[21] Appl. No.: 111,233

[22] Filed: Aug. 24, 1993

[51] Int. Cl.$^6$ ............................................. G01N 27/62
[52] U.S. Cl. .................. 364/496; 364/431.06; 73/23.32; 123/672
[58] Field of Search .................. 364/431.05, 431.06, 364/496, 497; 123/672, 673, 676, 677, 679, 681; 73/23.32

[56] References Cited

U.S. PATENT DOCUMENTS

| | | | |
|---|---|---|---|
| 3,939,654 | 2/1976 | Creps | 60/276 |
| 3,961,477 | 6/1976 | Grieshaber et al. | 60/274 |
| 4,000,614 | 1/1977 | Abthoff et al. | 60/276 |
| 4,251,990 | 2/1981 | Norimatsu et al. | 60/276 |
| 4,253,302 | 3/1981 | Asano et al. | 60/276 |
| 4,272,329 | 6/1981 | Hetrick et al. | 204/153.18 |
| 4,362,605 | 12/1982 | Bozon | 123/703 |
| 4,498,968 | 2/1985 | Yamanada et al. | 204/412 |
| 4,719,895 | 1/1988 | Mieno et al. | 123/689 |
| 4,761,950 | 8/1988 | Nagai et al. | 123/691 |
| 4,841,934 | 6/1989 | Logothetis et al. | 123/693 |
| 4,987,888 | 1/1991 | Funabashi et al. | 123/488 |
| 5,050,084 | 9/1991 | Nakaniwa | 364/431.06 |
| 5,083,427 | 1/1992 | Anderson | 60/274 |
| 5,093,792 | 3/1992 | Taki et al. | 364/431.01 |
| 5,094,213 | 3/1992 | Dudek et al. | 123/478 |
| 5,273,019 | 12/1993 | Matthews et al. | 123/571 |
| 5,349,932 | 9/1994 | Boverie et al. | 123/399 |

FOREIGN PATENT DOCUMENTS

444783A1 9/1991 European Pat. Off. .

OTHER PUBLICATIONS

SAE Technical Paper Series 860409 Feb. 24–28, 1986 Wide-Range Air Fuel Ratio Sensor.
A Portable Fast Response Air–Fuel Ratio Meter Using an Extended Range Oxygen Sensor Nissan Motor Co., Ltd. 880559.

(List continued on next page.)

*Primary Examiner*—Emanuel T. Voeltz
*Assistant Examiner*—Kyle J. Choi
*Attorney, Agent, or Firm*—Nicholas C. Hopman

[57] ABSTRACT

A system, and a corresponding method, for measuring a chemical concentration of a gas exhausted from exhaust ports (409, 413) of a multi-cylinder internal combustion engine (401) includes a gas sensing device. This device (419) is preferably a UEGO (Universal Exhaust Gas Oxygen) sensor. The gas exhausted is present in a substantially stable chemical concentration (706, 718) at a collection point (420) during intervals (738, 742) of engine angular rotation corresponding to the exhaust cycles. The UEGO sensor (419) measures the gas exhausted from the exhaust ports (409, 413) and provides a sensory output signal (743) that, during the intervals (738, 742) of engine angular rotation corresponding to each of the exhaust cycles, approaches (737, 741) a substantially stable value representative of the chemical concentration of the gas (706, 718) exhausted during the associated exhaust cycle. The sensory output signal (743) is coupled to an engine control system (431) that is executing signal reconstruction method steps (500, 600). These signal reconstruction steps (500, 600) are preferably based on a Kalman-Bucy state estimator in which a constituent gas signal $\hat{P}_{oe}$ (745) that has a substantially constant amplitude during the intervals (738, 742), is reconstructed by the Kalman-Bucy state estimation reconstruction process (500, 600). The described improved method, and system, can compensate for the static and dynamic temporal and spacial effects, characteristic of the multi-cylinder engine exhaust system and the difference in sensory response to rich and lean exhaust gases, of the UEGO (419) sensor.

56 Claims, 10 Drawing Sheets

OTHER PUBLICATIONS

Air Fuel Ratio Sensor for Rich, Stoichiometric and Lean Ranges 860408 Hitachi Research Laboratory.

Closed Loop Control at Engine Management System Motronic 880135, Gunther Kaiser, Martin Zechnall, and Gunther Plapp.

Wide Range Air–Fuel Ratio Control System 880134 Hitachi, Ltd.

A Tutorial Introduction to Estimation and Filtering, Ian B. Rhodes, IEEE Transactions on Automatic control, vol. AC–16 No. 6 Dec. 1971.

Requirements and Performance of Engine Management Systems under Transient Conditions 910083 N. F. Benninger and G. Plapp.

Development of a Highly Accurate Air–Fuel Ratio Control Method Based on Internal State Estimation 920290 Hitachi, Ltd.

Nonlinear, Closed Loop, SI Engine Control Observers 920237 The Technical University of Denmark.

Individual Cylinder Air–Fuel Ratio Control with a Single EGO Sensor IEEE Transactions on Vehicular Technology, vol. 40 No. 1 Feb. 1991.

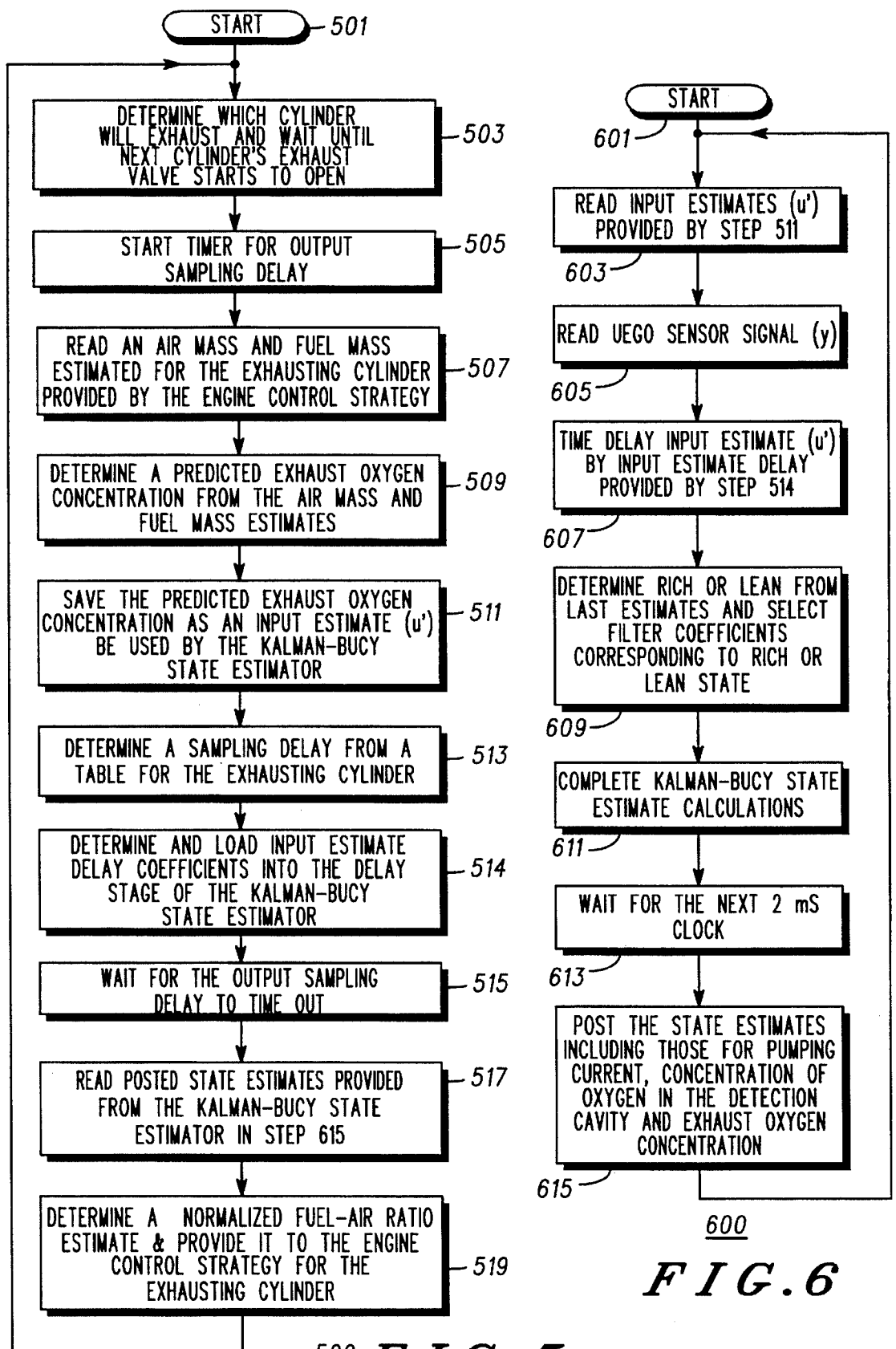

FIG. 8

$$\hat{X}(k+1|k) = A \cdot \hat{X}(k|k) + B \cdot u(k)$$

$$\begin{bmatrix} \hat{P}_{oe}(k+1|k) \\ \hat{P}_{od}(k+1|k) \\ \hat{I}_p(k+1|k) \\ \hat{V}_3(k+1|k) \\ \hat{V}_4(k+1|k) \\ \hat{V}_{out}(k+1|k) \end{bmatrix} = \begin{bmatrix} 0 & 0 & 0 & 0 & 0 & 0 \\ b_{11} & a_{11} & a_{12} & a_{13} & a_{14} & a_{15} \\ b_{21} & a_{21} & a_{22} & a_{23} & a_{24} & a_{25} \\ b_{31} & a_{31} & a_{32} & a_{33} & a_{34} & a_{35} \\ b_{41} & a_{41} & a_{42} & a_{43} & a_{44} & a_{45} \\ b_{51} & a_{51} & a_{52} & a_{53} & a_{54} & a_{55} \end{bmatrix} \cdot \begin{bmatrix} \hat{P}_{oe}(k|k) \\ \hat{P}_{od}(k|k) \\ \hat{I}_p(k|k) \\ \hat{V}_3(k|k) \\ \hat{V}_4(k|k) \\ \hat{V}_{out}(k|k) \end{bmatrix} + \begin{bmatrix} 1 \\ 0 \\ 0 \\ 0 \\ 0 \\ 0 \end{bmatrix} \cdot u(k)$$

FIG. 9

$$\hat{X}(k+1|k+1) = \hat{X}(k+1|k) + F_k \cdot \{y(k+1) - C \cdot \hat{X}(k+1|k)\}$$

$$\begin{bmatrix} \hat{P}_{oe}(k+1|k+1) \\ \hat{P}_{od}(k+1|k+1) \\ \hat{I}_p(k+1|k+1) \\ \hat{V}_3(k+1|k+1) \\ \hat{V}_4(k+1|k+1) \\ \hat{V}_{out}(k+1|k+1) \end{bmatrix} = \begin{bmatrix} \hat{P}_{oe}(k+1|k) \\ \hat{P}_{od}(k+1|k) \\ \hat{I}_p(k+1|k) \\ \hat{V}_3(k+1|k) \\ \hat{V}_4(k+1|k) \\ \hat{V}_{out}(k+1|k) \end{bmatrix} + \begin{bmatrix} f_{k1} \\ f_{k2} \\ f_{k3} \\ f_{k4} \\ f_{k5} \\ f_{k6} \end{bmatrix} \cdot \{y(k+1) - [0\,0\,0\,0\,0\,1] \cdot \begin{bmatrix} \hat{P}_{oe}(k+1|k) \\ \hat{P}_{od}(k+1|k) \\ \hat{I}_p(k+1|k) \\ \hat{V}_3(k+1|k) \\ \hat{V}_4(k+1|k) \\ \hat{V}_{out}(k+1|k) \end{bmatrix}\}$$

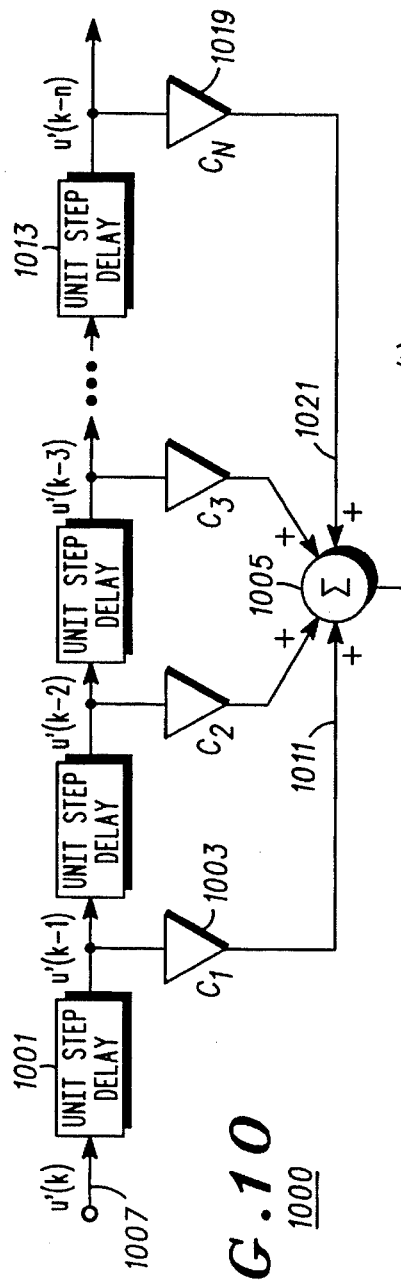
FIG.10
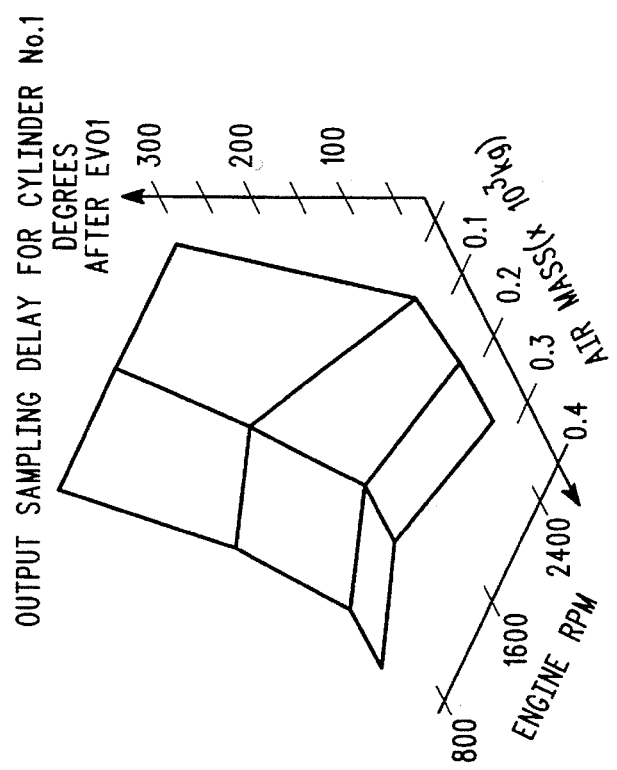
FIG.12 OUTPUT SAMPLING DELAY FOR CYLINDER No.1
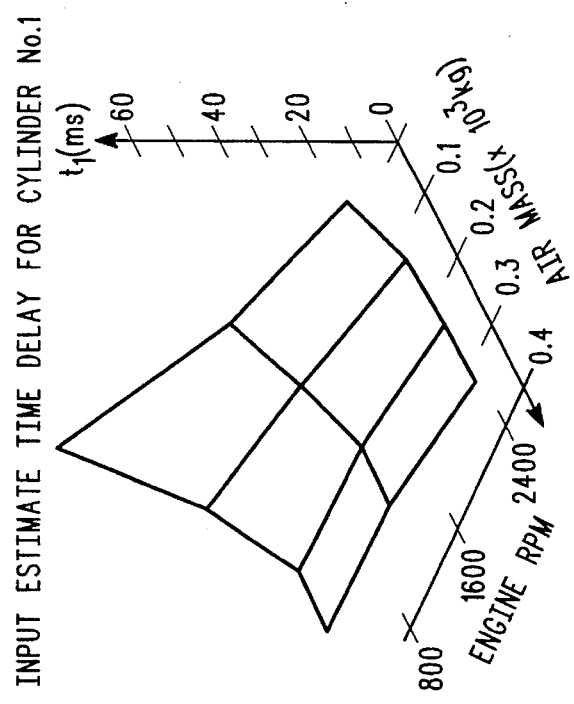
FIG.11 INPUT ESTIMATE TIME DELAY FOR CYLINDER No.1

FIG. 15

$$\frac{d}{dt}\begin{bmatrix} P_{od} \\ I_p \\ V_3 \\ V_4 \\ V_{out} \end{bmatrix} = \begin{bmatrix} \frac{-GR_{12}C_1RTD_gA}{(1-R_1R_{21}C_1G)nFP_{od}|_{\lambda=1.02}V_dL} + \frac{nFP_{od}|_{\lambda=1.02}}{RTG} & \frac{-D_gA}{V_dL} & 0 & 0 & 0 \\ \frac{R^2T^2}{(n^2F^2P_{od}|_{\lambda=1.02}V_d)} \cdot \frac{GR_{12}C_1}{(1-R_1R_{21}C_1G)} + \frac{GR_1}{(1-R_1R_{21}C_1G)} & \frac{RT}{V_dnF} & \frac{-2}{R_3C_3} & 0 & 0 \\ \frac{GR_{12}C_1D_0ART}{(1-R_1GR_{12}C_1)V_dLnFP_{od}|_{\lambda=1.02}} & 0 & \frac{2}{R_3C_3} & 0 & 0 \\ 0 & 0 & 0 & 0 & -1 \\ \frac{RT}{R_{21}C_{21}R_{22}C_{22}nFP_{od}|_{\lambda=1.02}} & 0 & 0 & 1 & \frac{1}{R_{22}C_{21}} + \frac{1}{R_{21}C_{21}} \cdot \frac{-1}{R_{21}C_{21}R_{22}C_{22}} \end{bmatrix} \cdot \begin{bmatrix} P_{od} \\ I_p \\ V_3 \\ V_4 \\ V_{out} \end{bmatrix} + \begin{bmatrix} \frac{D_gA}{V_dL} \\ 0 \\ 0 \\ 0 \\ 0 \end{bmatrix} \cdot P_{oe}$$

STATE ESTIMATOR BASED EXHAUST GAS CHEMISTRY MEASUREMENT SYSTEM AND METHOD

FIELD OF THE INVENTION

This invention is generally directed to the field of measuring exhaust gas chemistry resulting from a combustion process in a internal combustion engine, and specifically for measuring individual exhaust port contribution in a combined exhaust gas stream. In particular, it is useful for measuring oxygen concentration and providing a measurement of air-fuel ratio to a control system for controlling individual cylinders of a multi-cylinder internal combustion engine.

BACKGROUND OF THE INVENTION

Many contemporary control systems for controlling multi-cylinder internal combustion engines rely on a direct measurement of exhaust gas chemistry at the engine's output to finely tune a combustion process. The direct measurement is important because by using this measurement in a control system, emissions can be reduced to a level necessary to comply with legislated emissions standards.

Of the various exhaust gas constituents oxygen is the most commonly measured gas in production vehicles. By measuring oxygen concentration an air-fuel ratio can be determined. Air-fuel ratio is useful for controlling engine emissions. For determination of oxygen concentration and thus air-fuel ratio, most modern control systems rely on a particular type of exhaust gas chemistry sensor known as an EGO, or exhaust gas oxygen sensor. This sensor is also commonly known as an $O_2$ or a $\lambda$ (lambda) sensor. This sensor is typically positioned in an exhaust gas stream between the engine's exhaust manifold and a catalytic converter. The oxygen concentration in the exhaust gas stream is indicative of the exhausted air-fuel ratio. This two state sensor senses that the engine's exhaust gas stream is either rich or lean about a point of stoichiometry which corresponds to an air-fuel ratio of about 14.6:1 for gasoline fuel. When the exhaust gas stream has an air-fuel ratio of 14.6:1 then stoichiometric combustion is taking place in the engine and emissions, particularly carbon monoxide, are reduced significantly by the catalytic converter.

In a multi-cylinder engine the exhaust gas stream represents a combined output from all of the engine's cylinders. The engine control system is responsible for controlling the supply of fuel such that with the current air supply the measured air-fuel ratio of the exhaust gas stream observes stoichiometric combustion. It is well established that differences in engine intake port geometry and fuel system component tolerances will cause a significant difference in individual cylinder contribution to the air-fuel ratio of the exhaust gas stream.

As legislation continues to require tougher standards these measurement and control systems must get better. One approach has been to control the fuel injected on a cylinder-by-cylinder basis. This requires a sensory system that can distinguish individual cylinder air-fuel ratios in the exhaust gas stream. This individual cylinder control of air-fuel ratio allows for compensation of the aforementioned engine component part intolerance and geometric factors. As a result of applying this approach, carbon monoxide and other emissions can be reduced in support of the legislated emissions standards.

To implement a control system for controlling individual cylinder air-fuel ratios, some have suggested the use of a singular exhaust gas sensor. Some systems use the traditional EGO sensor and some use a proportional sensor. These proportional sensors provide a signal representative of a measured air-fuel ratio that is proportional to, or linearly dependent on, the oxygen content of the measured exhaust gas stream. This is in contrast with more conventional EGO sensors which only provide a discrete two-state output indicating either a rich or lean measurement as described above. Although the measurement of individual cylinders with a traditional EGO sensor shows an improvement over contemporary systems, the combination of proportional and individual cylinder measurement can provide the additional measurability necessary to meet emissions standards. Proportional air-fuel ratio sensors are commonly known as UEGO, or universal exhaust gas oxygen sensors. Of course, to measure individual cylinders individual UEGO sensors could be positioned at each exhaust port of a multi-cylinder engine. However, this approach is cost, weight, and space prohibitive. Further, it is not very reliable because the added UEGO sensors and interface support substantially reduces the system's reliability.

Applying a singular oxygen sensor, in a combined exhaust gas stream for measuring individual cylinder air-fuel ratios presents many difficult technical challenges to a measurement system. Prior art systems showing a singular oxygen sensor in a combined exhaust gas stream have not addressed all of these technical challenges. These technical challenges include static and dynamic temporal and spacial effects characteristic of a multi-cylinder internal combustion engine and its exhaust system. Also, oxygen sensors have response speed limitations that limit the useful frequency response of the sensor.

Regarding the response speed limitations of oxygen sensors, both UEGO and EGO sensors have a distortion characteristic dependent on the particular sensor's frequency response. A distortion manifests itself as signal attenuation and phase delay as higher frequency components are presented to the sensor. On typical sensors the useful frequency response is limited to about 11 Hz for the required accuracy. This is not sufficient for accurately measuring the air-fuel ratio of individual exhausting cylinders. For instance, at 2,000 RPM a typical eight cylinder engine will be exhausting at a rate of 67 times per second. Given this rate of change in the measured quantity, the frequency response of the typical oxygen sensor is inadequate to accurately operate in a multi-cylinder architecture.

The temporal considerations can be categorized into system related effects, and exhaust gas transport related effects. Note that the term transport, as it applies here, refers to an interconnection between the cylinders' exhausting ports and the oxygen sensor. This may include an exhaust manifold for combining multiple cylinders into a singular pipe.

Regarding system related temporal effects, different engines have different exhausting orders. This means that while one sequence may be 1-3-4-2, another may be 1-2-4-3 in a four cylinder example. Because of this, the particular exhausting cylinder must be identified at the oxygen sensor output, when evaluating individual cylinder air-fuel ratio. This is because when a particular cylinder is exhausting, the output of the sensor will respond to the exhaust gas stream chemistry associated with that particular cylinder. Other temporal considerations discussed below will further complicate this synchronization of exhausting order process. Another system related temporal effect is that of next-cylinder blow-off. When a particular exhaust port opens, the gaseous mixture in the corresponding cylinder's combustion chamber flows out into the exhaust manifold at a significant flow rate. Because the incumbent flow rate is relatively low in the exhaust manifold, a high rate of change of flow rate exists and the gaseous mixture rapidly displaces, or blows-off the incumbent gaseous mixture proximate the oxygen sensor. Because of this rapid change in flow rate, and the resulting rapid change of chemistry between the incumbent gaseous mixture and the next-cylinder's gaseous mixture, the oxygen sensor's output may change significantly. If this blow-off effect is not properly accounted for, a significant error may occur when interpreting the air-fuel ratio of individual exhausting cylinders. Next, exhaust gas transport temporally related effects will be detailed.

Multi-cylinder engines typically have an exhaust manifold structure with geometry dependent on a particular position of a cylinder. A difference in a length of a transport path of the exhaust gas stream is inherent if one cylinder's exhaust port is positioned physically closer to the downstream oxygen sensor than another. The different exhaust runner lengths, and the corresponding difference in the length of the transport paths, will cause a difference in propagation delay of the exhaust gas stream between exhausting cylinders from when an exhaust port opens to when the oxygen sensor senses the change in oxygen content in the exhaust gas stream. Additionally, a flow impedance presented to a particular cylinder's exhaust gas stream can be dynamically affected by engine load. This will cause a dynamic difference on propagation delay. Existing measurement systems do not compensate for these exhaust gas transport temporally related effects.

Transport spacial characteristics affect static flow impedance and may have certain resonant characteristics affecting the behavior of the exhaust gas stream for particular cylinders of a multi-cylinder engine. These spacial characteristics are caused by the particular geometry of the exhaust system. These transport spacial characteristics may result, for instance, in spectral attenuation and/or reflection of the exhaust gas stream.

Additionally, oxygen sensors typically exhibit different response characteristics depending on whether the exhaust gas is rich or lean. Unless this is accounted for, a computed air-fuel ratio will have significant error.

What is needed is an improved sensory system for measuring gas chemistry of a combined gas stream exhausted from a multi-cylinder internal combustion engine. The improved sensory system must take into consideration the static and dynamic temporal and spacial effects characteristic of a multi-cylinder engine exhaust system, the characteristic frequency response limitations of a gas chemistry sensor and the difference in sensory response to rich and lean exhaust gases.

BRIEF DESCRIPTION OF THE DRAWINGS

FIG. 5 is a software flow chart for illustrating various method steps embedded in the engine control system as described in the preferred embodiment and shown in FIG. 4;

FIG. 6 is a software flow chart for illustrating various UEGO signal reconstruction method steps embedded in the engine control system shown in FIG. 4;

FIG. 8 is a diagram of a prediction equation applied in a Kalman-Bucy state estimator in accordance with the invention;

FIG. 9 is a diagram of an state estimation equation applied in the Kalman-Bucy state estimator in accordance with the invention;

FIG. 10 is a block diagram of a delay stage applied in the Kalman-Bucy state estimator as described in the preferred embodiment;

FIG. 11 is a map showing an input estimate delay time attributable to cylinder #1;

FIG. 12 is a map showing an output sampling delay time attributable to cylinder #1;

FIG. 15 is a diagram of a linear equation representing a model of a UEGO sensor, in accordance with the invention.

DETAILED DESCRIPTION OF A PREFERRED EMBODIMENT

Figure 1:
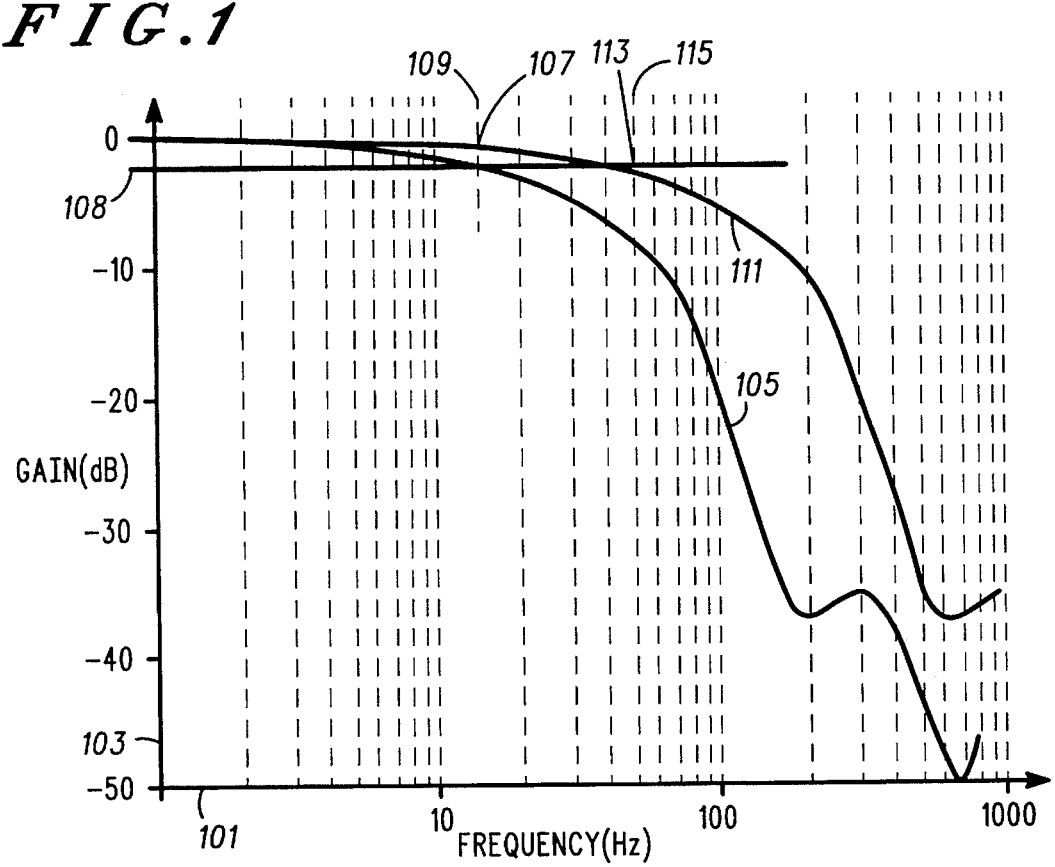
FIG. 1 is a frequency response diagram used to show an actual, and a desirable frequency response for a UEGO sensor.

A system, and corresponding method, for measuring exhaust gas chemistry exhausted from a multi-cylinder internal combustion engine includes an exhaust gas chemistry sensor. Preferably, this sensor develops a proportional output signal that is indicative of the oxygen content in an exhaust gas stream exhausted from the multi-cylinder internal combustion engine. One proportional type of oxygen sensor is commonly known as a UEGO sensor, or universal exhaust gas oxygen sensor. The system and method used to process the sensory output signal takes into consideration the static and dynamic temporal and spacial flow effects characteristic of an exhaust system. Also, characteristic response speed limitations, and a variable frequency response based on measuring rich or lean gases of the UEGO sensor are compensated for.

Alternatively, constituent exhaust gas components, other than oxygen, may be recovered from the combined exhaust gas stream. For instance, sensors for hydrocarbons, nitrous oxide, hydrogen, and carbon monoxide are available on the market today. Each of these sensors could be used with the system and corresponding method described herein with beneficial results.

The system measures a chemical concentration of oxygen exhausted from a plurality of exhaust ports of a multi-cylinder internal combustion engine. The oxygen exhausted from each of the plurality of exhaust ports is present in a substantially stable chemical concentration during a fixed interval of angular rotation of the multi-cylinder internal combustion engine. Sensory means, preferably based on a UEGO sensor, is responsively coupled to the plurality of exhaust ports of the multi-cylinder internal combustion engine through an exhaust manifold. The sensory means measures the oxygen exhausted and provides a sensory output signal that during the fixed interval of angular rotation of the multi-cylinder internal combustion engine, asymptotically, approaches a value representative of the chemical concentration of the oxygen exhausted. Signal reconstruction means, preferably based on a Kalman-Bucy state estimator, provides a constituent gas signal estimate indicative of the chemical concentration of the oxygen exhausted by each of the plurality of exhaust ports, responsive to the sensory output signal provided by the sensory means. Details of the Kalman-Bucy state estimator will be revealed below. Alternatively, the signal reconstruction means may be based on another filtering technique described later.

Before discussion of details of the preferred embodiment, it would be helpful to briefly review some theoretical models of a UEGO sensor and an engine's exhaust system. This discussion addresses primarily two areas, UEGO sensor frequency response considerations, and an engine's exhaust system's gas transport considerations.

First the sensor will be discussed. UEGO sensory dynamics have been well characterized by others, therefore, only a simple description will be undertaken here. For further reference please see U.S. Pat. No. 4,498,968, entitled OXYGEN SENSOR, dated Feb. 12, 1985, and authored by Yamada et al. The UEGO sensor output is a signal representing a pumping current in a control loop internal to the sensor. This pumping current is used to maintain partial pressure of oxygen in a detection cavity. As a concentration of sensed oxygen changes, this pumping current changes and therefore indicates the change of sensed oxygen.

FIG. 1 is a frequency response diagram used to show an actual frequency response for a UEGO sensor and also, a desirable frequency response useful in a system intended to control the individual air-fuel ratio of each cylinder of an engine. The horizontal scale 101 represents frequencies between a range of 1 Hz and 1,000 Hz. The vertical scale 103 represents an amplitude corresponding to an output of a UEGO sensor with respect to frequency. A curve 105, located on the frequency response diagram, represents a typical amplitude vs. frequency response of a UEGO sensor. Note that as frequency increases, the amplitude response of the UEGO sensory signal declines. At a reference point 107 the sensory signal 105 has fallen below a reference level 108 which corresponds to a frequency 109 of about 11 Hz. This relatively slow response is problematic when a UEGO sensor is used in a combined exhaust gas stream to measure the individual oxygen content in the exhaust gas stream of multiple cylinders. This is because the rate at which the gas is changing is too fast to allow the sensory output signal to settle to an accurate and steady value before another cylinder's exhaust port opens and dumps new gas into the exhaust manifold to be sensed by the UEGO sensor.

Another curve 111 shows a desirable frequency response for a UEGO sensor used in a multi-cylinder configuration for effectively acquiring information necessary for individual air-fuel ratio measurement. At a reference point 113 the sensory signal 111 has fallen below a reference level 108 which corresponds to a frequency 115 of about 50 Hz. In summary, the relatively poor frequency response of the UEGO sensor manifests itself in signal attenuation and phase delay as frequency components of higher frequencies are presented to the sensor. This will definitely be the case in an application that shares a common UEGO sensor with several exhaust ports.

Figure 2:
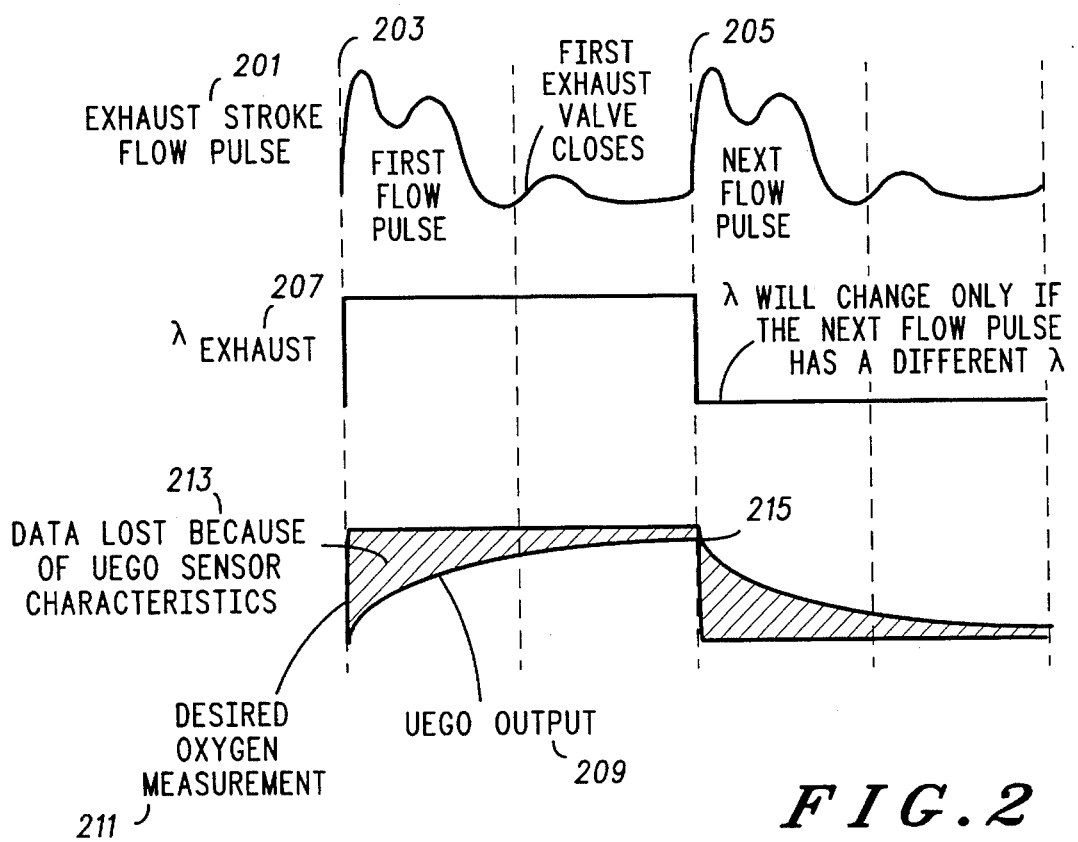
FIG. 2 is a diagram illustrating various characteristic waveforms discussed herein.

FIG. 2 is a diagram illustrating an example of an exhaust stroke induced flow pulse 201. Notice that as a particular cylinder's exhaust valve opens, shown by reference number 203, the exhaust flow pulse 201 rises very fast, then decays showing some damped oscillatory behavior to a zero flow-rate at reference number 205 after the exhaust valve closes. A coincidental prediction of the oxygen content, or equivalently, the normalized air-fuel ratio in the exhausted gas, or $\lambda_{EXHAUST}$ 207, reveals a relatively constant concentration of oxygen over the interval 203–205. Note that $\lambda$ is defined as the air-fuel ratio divided by the stoichiometric air-fuel ratio. In exhaust gas lean stoichiometry $\lambda$ has a one-to-one correspondence with oxygen concentration, that is to say that oxygen concentration is a function of $\lambda$.

Significantly, a coincident measurement of oxygen content in the gas exhausted by a typical UEGO sensor reveals a meaningful loss of information at the commencement of the exhaust stroke 203. The oxygen content measurement doesn't stabilize before a new flow pulse occurs at reference number 205. This is illustrated at reference number 215. Note that this meaningful loss of information will happen at all engine speeds for the multi-cylinder engine. This is because there is inadequate time for the sensor output to reach a steady value between exhaust events. Since the behavior of the UEGO sensor output only approaches but does not reach a steady value representative of the chemical concentration of the gas exhausted, it can not be directly used to accurately indicate the oxygen exhausted in a functioning engine. Further, this behavior becomes even more significant when adjacent exhausting cylinders' future exhaust flows displace the chemical concentration presented to the common UEGO sensor before its output is allowed to settle to a substantially stable value. Reference number 211 indicates a desired behavior of the sensory output. This desired behavior represents an output of an ideal oxygen sensor that doesn't have the slow response characteristic of the UEGO sensor. Reference number 213 indicates the data lost due to the slow frequency response of the typical UEGO sensor. Because the rate of change of UEGO sensor output signal is slow relative to the changes in exhaust gas composition in a multi-cylinder application, useful information indicative of a value representative of the chemical concentration of oxygen exhausted, must be extracted, or reconstructed from the provided UEGO output signal.

Another important characterization of the UEGO sensor is that of its different frequency response, or performance in rich and lean gases. This is because the diffusion rates of oxygen into the UEGO sensor's cavity from lean exhaust has a substantially different diffusion rate than the diffusion of hydrogen, carbon monoxide and hydrocarbons present in rich exhaust. Also, the number of electron charges per molecule involved in the primary gas reaction at the UEGO sensor's electrode is different for each species of primary gas.

In lean exhaust gases the following equation determines the steady state pumping current necessary to maintain partial pressure of oxygen in the detecting cavity.

$$I_p = \frac{nFD_oA}{RTL} \cdot (P_{oe} - P_{od}) \qquad \text{EQUATION 1}$$

where:

$I_p$=pumping current in amps n=number of electron charges per molecule involved in the gas reaction at the sensor's electrode=4 for oxygen F=Faraday's constant
D$_o$=diffusion coefficient of oxygen
A=effective cross sectional area of diffusion path
L=effective length of diffusion path
P$_{oe}$=partial pressure of oxygen in the exhaust gas stream
P$_{od}$=partial pressure of oxygen in the detecting cavity
T=gas temperature
R=gas constant In rich exhaust gases the following equation determines the steady state pumping current necessary to maintain partial pressure of oxygen in the detecting cavity.

$$I_p = \frac{nFA}{RTL} \cdot (D_H \cdot P_{He} + D_{CO} \cdot P_{COe} + \Sigma D_{CnHm} \cdot P_{CnHme}) \quad \text{EQUATION 2}$$

where, in addition to the above defined variables:
D$_H$=diffusion coefficient of H$_2$
D$_{CO}$=diffusion coefficient of CO
D$_{CnHm}$=diffusion coefficient of C$_n$H$_m$
P$_{He}$=partial pressure of H$_2$ in the exhaust gas
P$_{COe}$=partial pressure of CO in the exhaust gas
P$_{CnHme}$=partial pressure of C$_n$H$_m$ in the exhaust gas
n=number of electron charges per molecule involved in the gas reaction at the sensor's electrode=2 for H$_2$, CO, and C$_n$H$_m$ Observation of the above relationships, and empirical validation has shown that for rich gases the sensory response is significantly slower than for lean gases.

Another of the characteristic problems with measuring individual cylinder exhaust gas oxygen content with a singular sensor includes, both static and dynamic exhaust gas transport effects. Further, some of these effects are both temporal and spacial in nature.

Transport of the exhaust gasses from an exhausting port to a downstream UEGO sensor occurs via flow and mass diffusion mechanisms. Regarding the static temporal effects, at the commencement of the exhaust process for a particular cylinder, an exhaust valve opens and the exhaust gas flows from an elevated pressure in the cylinder to a lower pressure of the exhaust manifold and is then pushed out of the cylinder by the piston. During this process the exhaust gas expands into the exhaust manifold volume and is transported to the UEGO sensor positioned downstream. To keep the model simple it is assumed that the newly combusted and exhausted gas displaces the combusted and exhausted gas left in the exhaust manifold from a previous cylinder's exhaust event.

A first approximation of a static gas transport delay between the exhaust port of a particular cylinder and the oxygen cylinder can be deterministically modeled with the following equation.

$$G_{exhaust}(S) = e^{-T_2 s} \quad \text{EQUATION 3}$$

where:
T$_2$=temporal delay
s=Laplace operator

It has been empirically determined that T$_2$ is within the range of 0.004 s to 0.050 s. This example of a static temporal effect differs for each cylinder in a multi-cylinder configuration having a different transmission path length from the respective exhaust port to the common UEGO sensor.

Figure 3:
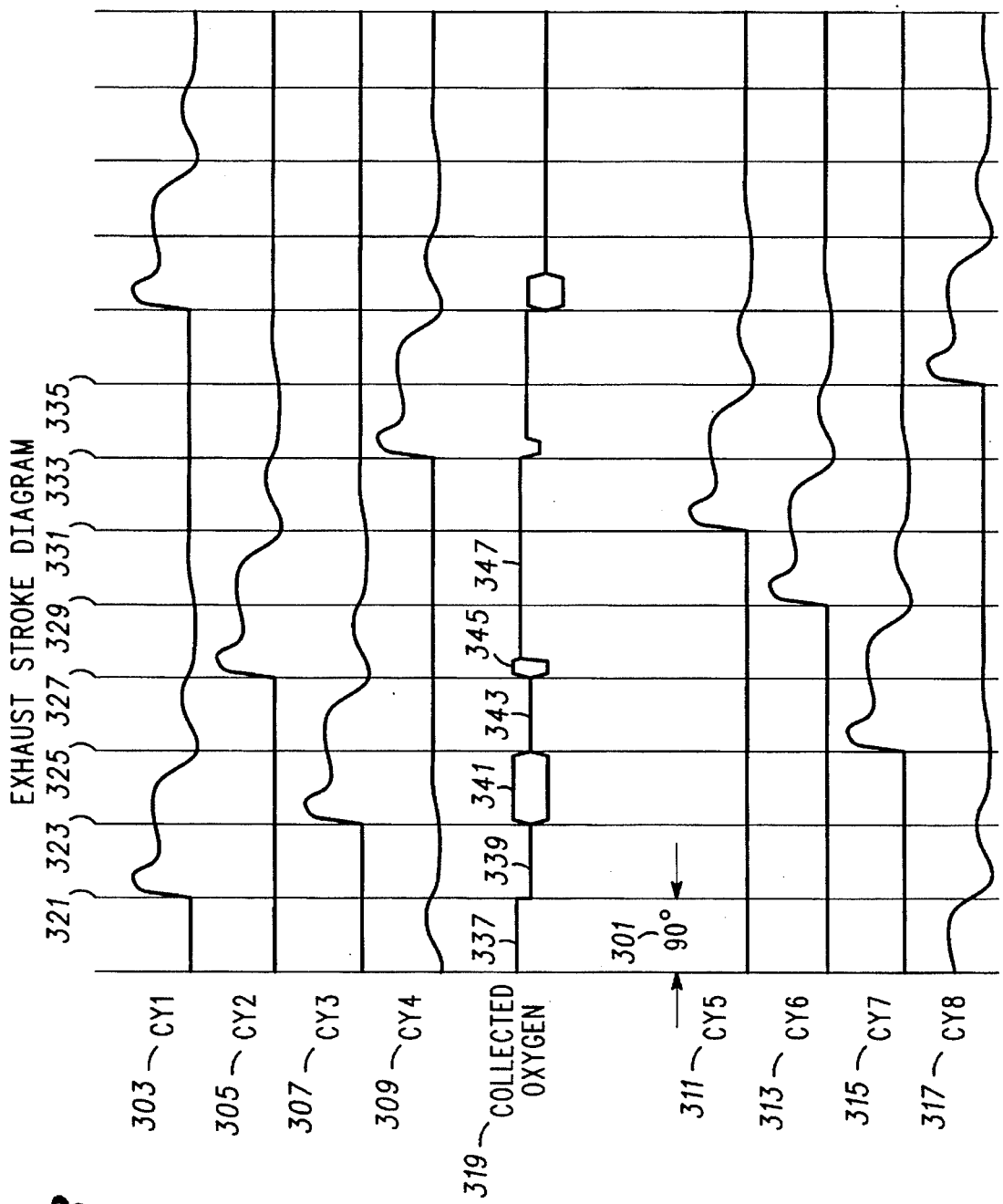
FIG. 3 is a chart of waveforms showing various temporal and frequency responses as detailed in the preferred embodiment.

Another static system temporal effect is detailed in FIG. 3 which illustrates various waveforms observed from a conventional 8-cylinder engine. This temporal effect is the aforementioned firing order effect. A sequence of flow pulses are shown with a flow pulse 303, shown commencing at reference number 321, resulting from cylinder #1's exhaust port opening and dumping exhaust gas into the exhaust manifold. Note that individual flow pulses 303, 305, 307, 309, 311, 313, 315, and 317 are separated by 90° intervals 301 and are typically of 180° to 240° in duration. The flow pulse 307 caused by cylinder #3's exhaust port opening is shown commencing at reference number 323. Also, the flow pulse 315 caused by cylinder #7's exhaust port opening is shown commencing at reference number 325. Then, the flow pulse 305 caused by cylinder #2's exhaust port opening is shown commencing at reference number 327. Next, the flow pulse 313 caused by cylinder #6's exhaust port opening is shown commencing at reference number 329. Then, the flow pulse 311 caused by cylinder #5's exhaust port opening is shown commencing at reference number 331. Next, the flow pulse 309 caused by cylinder #4's exhaust port opening is shown commencing at reference number 333. And to complete an engine cycle, the flow pulse 317 caused by cylinder #8's exhaust port opening is shown commencing at reference number 335.

In this case, a singular UEGO sensor is coupled at a collection point to a first exhaust bank of an 8 cylinder engine for collecting oxygen associated with cylinders 1, 2, 3, and 4. Resulting from the exhausting flow pulses associated with cylinders 1–4 is a prediction of oxygen collected 319 to a common, or collected, point of the exhaust manifold coupled to the cylinders 1–4. Note that for discussion purposes, effects dependent on a variable path length between the respective cylinder's exhaust ports and the collection point mentioned earlier are not modeled here. Notice also that the predictions include different concentrations of oxygen corresponding to different exhaust gas concentrations associated with the respective exhausting cylinders. This is shown by reference numbers 339 associated with the exhausted oxygen from cylinder #1 only, 341 associated with the exhausted oxygen from both cylinders #1 and #3, 343 associated with the exhausted oxygen from cylinder #3 411 only, 345 associated with the exhausted oxygen from both cylinders #3 and #2, and 347 associated with the exhausted oxygen from cylinder #2 only. Note that reference number 337, 341, and 345 indicate unknown values for oxygen present at the collection point. This is caused by some cylinder exhausting events overlapping others, thus resulting in a mixture of gas at the collection point. This disturbs the oxygen at the collection point, making it unpredictable.

Discussion of details of a second exhaust bank are not important here and the exhausting order is only shown to illustrate the effect it has on the first exhaust bank. This is important to note because when considering a combined exhausted oxygen output from a particular bank, the exhausting order of the engine needs to be taken into account, as shown in this chart to account for the differing intervals between each of the individual cylinder's flow pulses.

Examples of dynamic exhaust transport temporal delays include influences related to engine load, as defined by air and fuel charge mass charged into the exhausting cylinder (pre-combustion), piston speed, and other variables that affect the dynamics of gas flow during the exhaust gas process. In particular these causes can effect the propagation of the exhaust gas flow from the respective exhaust port to the common UEGO sensor. Since accurate deterministic models of these effects are rather complex, they can be determined empirically. Examples of these effects are presented later.

Static spacially related effects include the differing flow impedance related to the individual differences in geometric shape and length of the individual exhaust runners coupled to each of the exhaust ports. One geometric consideration of importance is the cross-sectional area of the exhaust runners. The propagation time of the exhaust flows is dependent on this factor. Because of this difference, the flow impedance each exhaust port must force, or push, into is different.

Dynamic spacially related effects include a change in flow impedance based on a reflection of pressure back to an exhaust port when its exhaust valve is opening and the aftermath from previous exhaust flow pulses are present in the exhaust manifold. Because of these disturbing pressures, the exhausting cylinder will be exhausting into a dynamic flow impedance depending on its position related to other cylinders.

Since accurate deterministic models of these static and dynamic spacially related effects are rather complex, they can be determined empirically.

Now that the underlying deterministic models and empirical explanation have been discussed, a detailed description of the preferred embodiment will commence.

Figure 4:
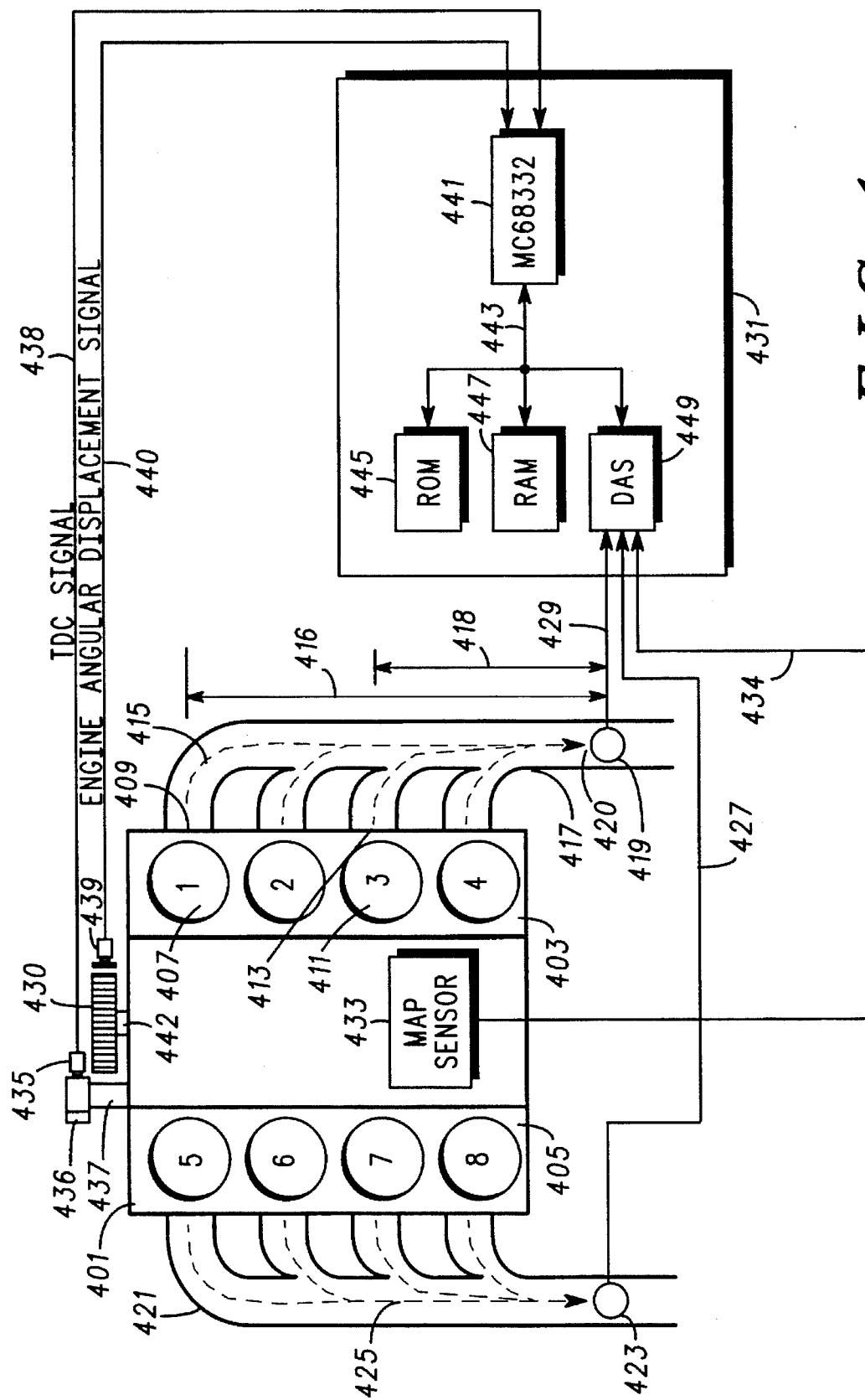
FIG. 4 is a system block diagram, including an engine control system in accordance with the preferred embodiment.

FIG. 4 shows a system block diagram illustrating an engine and an engine control system for measuring the oxygen output of the engine's exhausting banks and for producing an air-fuel ratio used in an emissions control strategy. An engine 401 has a first exhaust bank 403 and an opposing exhaust bank 405. In the first exhaust bank 403 cylinder #1 407 has an exhaust port 409. Also, cylinder number 3 411 has an exhaust port 413. These exhaust ports 409, 413, and the others in the first exhaust bank 403, exhaust a gas stream 415 when these exhaust ports open. This exhaust gas stream 415 contains numerous constituent gases including, of interest here, oxygen. These gases 415 are collected into an exhaust manifold and runner system 417 that in-effect combines the exhaust gas stream 415 into a first UEGO sensor 419 at the collection point, here 420. This first UEGO sensor 419 outputs a signal 429 indicative of an oxygen content in the exhaust gas stream 415.

Reference number 416 illustrates a path length associated with a portion of the exhaust runner system 417 positioned between the exhaust port 409 for cylinder #1 407 and the collection point 420. Also, reference number 418 illustrates another path length associated with a portion of the exhaust runner system 417 positioned between the exhaust port 413 for cylinder #3 411. Notably, the path lengths 416 and 418 are different. This difference will result in a geometrically inherent difference in temporal delays, or exhaust gas flow propagation times between the respective exhaust ports 409 and 413, and the collection point 420 of the UEGO sensor 419. Also of significance are the differing geometric, or spacial shapes of portions of the exhaust runner system 417 positioned between cylinder #1's exhaust port 409 and cylinder #3's exhaust port 413 and the UEGO sensor 419. This inherent difference will be the cause of additional measurement errors because the flow impedance that the respective exhaust valves 409 and 413 will emit exhaust gas into, are significantly different. This is an example of a spacially related effect mentioned earlier.

The opposing cylinder bank 405, has a corresponding manifold and runner system 421. This opposing cylinder bank 405 has an opposing UEGO sensor 423 for measuring a combined exhaust gas stream 425. This opposing UEGO sensor 423 outputs a signal 427 indicative of an oxygen content in the exhaust gas stream 425.

Figure 13:
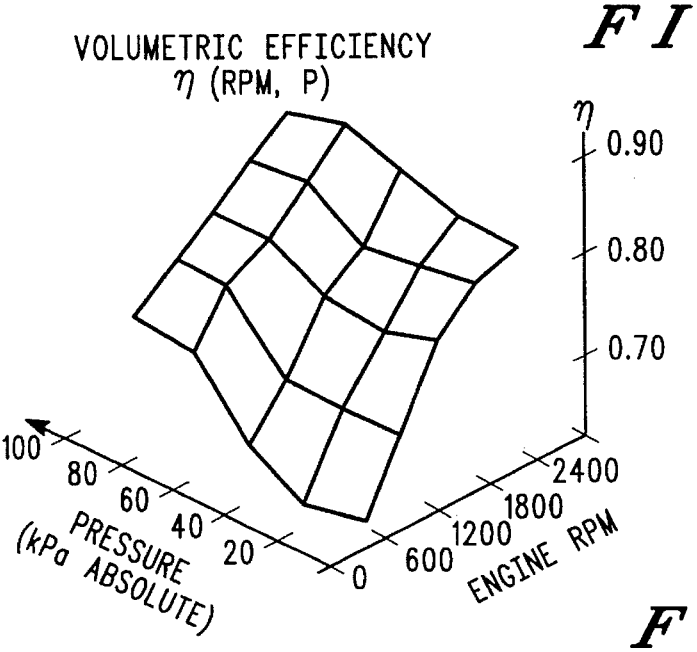
FIG. 13 is a map showing cylinder volumetric efficiency in terms of engine RPM and absolute pressure.

Referring back to the first cylinder bank 403, the sensory output signal 429, of the first UEGO sensor 419, is input into an engine control system 431. This engine control system 431 also receives input from a manifold absolute pressure sensor 433 which is used to determine engine load, which is another system dynamic of importance. Alternatively, a mass air flow sensor may be used to measure engine load. Either sensor is positioned to measure an engine intake manifold measurement. The manifold absolute pressure sensor 433 sends an output signal 434 to the engine control system 431. Earlier identified, was a cause and effect relationship between engine load and a dynamic exhaust transport temporal delay. Later, a method of compensation for engine load will be described. Preferably, the manifold absolute pressure output signal 434 is converted into mass. This is accomplished by executing the following equations on a microcontroller 441 indigenous to the engine control system 431.

$$m = \rho V \eta \qquad \text{EQUATION 4}$$

where:
V=volume of a cylinder
ρ=air density
η=volumetric efficiency
ρ may be determined as follows:

$$\rho = \frac{P}{RT} \qquad \text{EQUATION 5}$$

where:
P=manifold absolute pressure as measured
R=a gas constant, 0.287 kJ/kgK (for air)
T=absolute temperature of the air in the inlet manifold (measured in °K.)
and η may be determined as follows:

$$\eta = \eta(RPM,P) \qquad \text{EQUATION 6}$$

where:
P=manifold absolute pressure as measured
RPM=engine speed in revolutions/minute A graphical representation of this is shown in FIG. 13. So, by measuring absolute temperature of the air in the inlet manifold and manifold absolute pressure the above computations can be executed on the microcontroller 441. Note that η is determined based on a look-up table, preferably constructed from the graph in FIG. 13, and indexed by engine RPM and intake manifold pressure. The following is an example of a look-up table based on FIG. 13.

TABLE 1

| Engine RPM | Absolute Pressure in Inlet Plenum (kPa) | | | | |
|---|---|---|---|---|---|
| | 20 | 40 | 60 | 80 | 100 |
| 600 | 0.60 | 0.66 | 0.73 | 0.76 | 0.77 |
| 1200 | 0.60 | 0.67 | 0.72 | 0.76 | 0.78 |
| 1800 | 0.64 | 0.68 | 0.74 | 0.76 | 0.81 |
| 2400 | 0.72 | 0.76 | 0.78 | 0.81 | 0.84 |
| 3000 | 0.74 | 0.77 | 0.79 | 0.81 | 0.83 |

The calculation will effect the conversion of manifold absolute pressure into mass which will be used to indicate mass air charge into the active, or exhausting, cylinder. The mass associated with the intake manifold, whether derived from a mass air flow sensor or from the manifold absolute pressure sensor 433, is applied on an individual cylinder basis. The use of this information will be described below.

Another input to the engine control system 431 is provided by a camshaft rotational sensor 435, which indicates a top-dead-center, or TDC, of cylinder #1 407 of the rotating engine 401 based on measuring a lobe 436 on the end of the camshaft 437. This camshaft rotational sensor 435 provides a TDC signal 438 to the engine control system 431 every 720° of engine 401 angular rotation. The TDC signal 438 is used by the engine control system 431 to determine a starting point for measuring which of the cylinders is currently exhausting.

Also, another input is provided by an engine angular displacement sensor 439 which measures engine angular displacement, by sensing a toothed wheel 430, mounted on the engine's 401 crankshaft 442. This engine angular displacement sensor 439 provides an engine angular displacement signal 440, to the engine control system 431, every 10° of engine 401 angular rotation. The engine angular displacement signal 440 is used by the engine control system 431 to determine over what intervals the cylinders are exhausting. Next, the engine control system 431 will be detailed.

Components of the engine control system 431 include the aforementioned microcontroller 441, in this case a Motorola MC68332 device. This microcontroller 441 receives the TDC signal 438, and the engine angular displacement signal 440. Conveniently, the microcontroller 441 converts the signals 438 and 440 from pulses to digital information representative of the information contained in the pulses used later in the executed method steps. Also, the microcontroller 441 communicates with supporting peripheral devices over a common data bus 443. The supporting peripheral devices include a Read Only Memory (ROM) 445 for storing a control program including various parameter tables. Details of this program will be introduced later in the discussion about the method. Also, the engine control system 431 includes a random access memory (RAM) 447 for temporary variable storage also used in the later described method. A data acquisition system (DAS) 449, is used to capture the signals 427, 429, and 434 provided by the corresponding UEGO sensors 419, 423, and the manifold absolute pressure sensor 433. The DAS 449 is constructed using a conventional 500 sample/second, 12 bit analog to digital converter with a multiplexer front end and a microcontroller interface. Those skilled in the art will recognize other apparatus that will provided largely the same utility as this engine control system 431 embodiment.

As mentioned above, a component part of the improved method and system is a Kalman-Bucy state estimator. The Kalman-Bucy state estimator is used to reconstruct the oxygen content exhausted from the combined exhaust gas stream 415 for each of the cylinders on the bank 403. In part, the Kalman-Bucy state estimator does this by predicting, or estimating, an actual oxygen content exhausted from each cylinder. This is accomplished by analyzing the behavior of the combined exhaust gas stream 415 against an engineering model of the system. This engineering model is defined below. The behavior measured includes input from the sensory output signal 429 of the UEGO sensor 419, engine position information provided by the apparatus 435, 436, 430, 439, and 431, an air charge estimate provided from a pressure or mass air flow sensor, and a fuel charge estimate provided from an independent process executing on the engine control 431. This independent process includes a conventional engine control strategy.

Alternatively, another signal reconstruction means, such as a conventional digital filter, can in-effect extract the higher order frequency components that were attenuated and delayed because of the response characteristics of the UEGO sensor. Additionally, other predictors, estimators, or observers, such as non-linear observers including sliding-mode observers, observers based on Lyapunov's hyperstability, or neural network based observers, may be substituted for the Kalman-Bucy state estimator. In either embodiment, a DSP (Digital Signal Processing) software mechanism will be used because of its superior performance in this type of system. The aforementioned Motorola MC68332 microcontroller is well suited to this type of task. Alternatively, there are many other DSP oriented controllers that may also be substituted in place of the Motorola MC68332 microcontroller.

Application of a Kalman-Bucy state estimator is preferable to a conventional filter. Of particular importance is the ability to easily extract state estimates based on observation of various behaviors internal to the UEGO sensor. This means that, with a proper engineering model, the Kalman-Bucy state estimator can provide another output signal representative of the behaviors of the engineering model. These behaviors may include concentration of oxygen in the UEGO's detection cavity and the pumping current which is a measure of an oxygen diffusion rate into the UEGO's internal detection cavity. By observing these internal behaviors, a more optimal signal reconstruction can be achieved which has better accuracy and noise immunity. Tracking internal variables and then using those variables for feedback control can be used to improve the response of the engine control system. The Kalman-Bucy state estimator also can provide a prediction of the final value for an about-to-be-measured UEGO sensory output signal—thus enabling the Kalman-Bucy state estimator to resolve to an accurate estimate faster than a conventional filter.

The Kalman-Bucy state estimator is executed in software on the microcontroller 441. The improved method, and associated system, collects, or combines, the output from the first cylinder bank 403 at the collection point 420 defined by the positioning of the UEGO sensor 419. After the conversion of the UEGO sensory output signal 429 by the DAS 449, the microcontroller, executing the preferred method including the Kalman-Bucy state estimator process, then reconstructs a signal that approaches a value representative of the stable oxygen content at the collection point 420 during an interval associated with the particular exhausting cylinder's exhaust cycle. The state estimation process includes the identification of the exhausting cylinder, consideration for all of the aforementioned static and dynamic temporal and spacial effects, the slow response of the UEGO sensor, and the difference in sensory response to rich and lean exhaust gases. The improved method, and the associated system, does all of this in real-time while the engine is running.

The method acts on the continuous UEGO sensory output signal 429, representing the combined output of the exhausting cylinders of the first cylinder bank 403. The method separates the continuous signal 429 into discrete values representing the individual oxygen estimates from the corresponding exhausting cylinders. This enables the engine control system 431 to execute an individual cylinder air-fuel ratio control strategy. This is very beneficial because with this granularity of information the engine control system 431 can be optimized to effect a significant reduction of carbon monoxide emissions based on individual cylinder air-fuel ratio control. Next, more details of the improved method, including the Kalman-Bucy state estimator will be revealed.

The improved method, including a Kalman-Bucy state estimator, applies an engineering model of the UEGO sensor, the engine position information, and the exhaust manifold runner configuration, to predict, or reconstruct, an accurate representation of the oxygen actually exhausted upstream of the UEGO sensor located at the 419 common collection point 420.

The engineering model of the UEGO sensor dynamics is first presented in the form of a set of linear state equations. As mentioned above, UEGO sensory dynamics have been well characterized by others. However, repeating them here in linear state equation form will help with the understanding of the improved method and system.

First, the rate of change of partial pressure of oxygen in the detection cavity can be modeled as follows.

$$\frac{dP_{od}}{dt} = \frac{D_g A}{V_d L} P_{oe} - \frac{D_g A}{V_d L} P_{od} + \frac{RT}{V_d nF} I_p \qquad \text{EQUATION 7}$$

where:

$P_{od}$=partial pressure of oxygen in the detecting cavity $D_g$=diffusion coefficient of the primary gas A=effective cross sectional area of diffusion path L=effective length of diffusion path $V_d$=volume of detection cavity $P_{oe}$=partial pressure of oxygen in the exhaust gas stream R=gas constant T=gas temperature n=number of electron charges per molecule involved in the gas reaction at the sensor's electrode=4 for oxygen F=Faraday's constant $I_p$=pumping current in amps Then, an internal variable the sense cell electrochemical potential, $V_s$ can be modeled as follows.

$$V_s = \frac{RT}{nF} \ln(P_{od}) + R_s I_{op} \qquad \text{EQUATION 8}$$

where:

$R_s$=resistance of the sense cell $I_{op}$=bias current necessary to pump oxygen into the reference cavity Since this equation is nonlinear, it is desirable to linearize it at a reasonable operating point such as λ=1.02. Thus, $$\frac{dV_s}{dt} = \left[ \frac{RT}{nF} \cdot \frac{1}{P_{od}} \Big|_{\lambda=1.02} \right] \cdot \frac{dP_{od}}{dt} \qquad \text{EQUATION 9}$$

Next, the circuit controlling the pumping current $I_p$ can be modeled as follows.

$$\frac{dI_p}{dt} = \frac{G R_{12} C_1}{(1 - R_1 G R_{12} C_1)} \left( \frac{dV_s}{dt} \right) + \qquad \text{EQUATION 10}$$

$$\frac{G}{(1 - R_1 G R_{12} C_1)} (V_s) + \frac{G R_1}{(1 - R_1 G R_{12} C_1)} (I_p)$$

where:

G=gain $R_n$=resistor values in internal UEGO circuit $C_n$=capacitor values in internal UEGO circuit An internal circuit node voltage $V_3$ can be modeled as follows.

$$\frac{dV_3}{dt} = \frac{2}{R_3 C_3} I_p - \frac{2}{R_3 C_3} V_3 \qquad \text{EQUATION 11}$$

where:

$R_n$=resistor values in internal UEGO circuit $C_n$=capacitor values in internal UEGO circuit An internal circuit node voltage $V_4$ can be modeled as follows.

$$\frac{dV_4}{dt} = \frac{1}{R_{21} C_{21} R_{22} C_{22}} V_s - \frac{1}{R_{21} C_{21} R_{22} C_{22}} V_{out} \qquad \text{EQUATION 12}$$

where:

$R_n$=resistor values in internal UEGO circuit $C_n$=capacitor values in internal UEGO circuit $V_{out}$=UEGO output signal Then, the output signal $V_{out}$ can be modeled as follows.

$$\frac{dV_{out}}{dt} = V_4 - \frac{1}{R_{22} C_{21}} I_p - \frac{1}{R_{21} C_{21}} V_{out} \qquad \text{EQUATION 13}$$

Before proceeding with the transformation of the above linear state equations into the Kalman-Bucy state estimator form, a brief review of Kalman-Bucy state estimator relationships will be undertaken.

A Kalman-Bucy state estimator is generally defined by the following state equations.

$$\hat{x}(k+1|k+1) = \hat{x}(k+1|k) + F_k(k+1)[y(k+1) - C\hat{x}(k+1|k)] \qquad \text{EQUATION 14}$$

where:

$\hat{x}$=an estimated state vector $F_k$=Kalman-Bucy state estimator gain matrix y=a state vector of an input signal—here the UEGO sensor output signal C=parameter matrix defining specifics of an engineering model k=discrete time index, where k+1 indicates a time step later than k Equation 14 is a correction equation. The purpose of this correction equation is to resolve a difference between the input signals and the expected signals as a result of the prediction that follows.

$$\hat{x}(k+1|k) = A\hat{x}(k|k) + Bu(k) \qquad \text{EQUATION 15}$$

where:

A=parameter matrix defining specifics of an engineering model—this engineering model will be based on the above described linear state equations that model the UEGO sensor's behavior B=parameter matrix defining specifics of an engineering model u=a vector of dynamic input—here an externally determined prediction of an oxygen level expected based on knowledge of the charge into the exhausting cylinder Equation 15 is a prediction equation which is used for predicting a future result of a state variable x(k+1|k) based on current dynamic input, the engineering model, and the last result of the correction equation x(k|k).

By applying the above equations (14 and 15), with engine positional information, the various parameter matrices (A, B, and C), and the gain matrix ($F_k$), the Kalman-Bucy state estimator can act on the combined UEGO signal 429 (y) and a dynamic input (u), representing an externally predicted oxygen concentration dependent on the expected air-fuel charge into the exhausting cylinder previous to combustion, to effectively predict the oxygen contribution of individual cylinders in the combined exhaust gas stream. Note that the dynamic input (u) is predicted independent of the Kalman-Bucy state estimator and is provided as an a priori input to the Kalman-Bucy state estimator in order to help it resolve faster.

Note that several excellent references teach additional detail for constructing state estimators and digital filters.

They include, "A New Approach to Linear Filtering and Prediction Problems" published in the Journal Basic Eng., 82, March, authored by R. E. Kalman, "New Results in Linear Filtering and Prediction Theory" published in the Transactions of the A. S. M. E. Ser. D, Journal Basic Eng., 83 December, 95–107, authored by R. E. Kalman and R. S. Bucy, "Digital Signal Processing in VLSI", published by Prentice Hall, 1990, authored by Richard J. Higgins, and "Introduction to Random Signals and Applied Kalman Filtering", published by John Wiley and Sons, Inc., 1992, authored by Robert Grover Brown and Patrick Y. C. Hwang.

Conveniently, the linear state equations represented in EQUATIONS 7–13 may be represented in matrix form as follows.

$$\frac{d}{dt} x_c = F x_c(t) + G u(t) \qquad \text{EQUATION 16}$$

where:

$$x_c(t) = \begin{bmatrix} P_{od} \\ I_p \\ V_3 \\ V_4 \\ V_{out} \end{bmatrix}$$

note that $x_c$ is an array of state variables which are functions of time—note that the subscript $c$ denotes that the state variables represent continuous time variables and u(t)=an array of input variables which are functions of time, in this case u=a scalar variable=$P_{oe}$ F and G=matrices of parameters—The F matrix represents how the state variable rates of change are related to the state variables. The G matrix represents how the state variable rates of change are related to the input variables.

An equation of output variables can be written as follows.

$$y(t) = C x_c(t) \qquad \text{EQUATION 17}$$

where:

y(t)=an array of output variables which are functions of time—in this case=$V_{out}$ or the voltage output of the UEGO sensor C=a matrix of output parameters The model output equation represented in EQUATION 17 represents a coupling "C" between the variables internal to the sensor and the output signal (y). In-effect, "C" represents the amplification from the internal variables to the output (y). $V_{out}$ has been selected here as a state variable for convenience In this case, the output equation of interest is:

$$y(t) = [0\ 0\ 0\ 0\ 1] x_c(t) \qquad \text{EQUATION 18}$$

FIG. 15 combines the above linear state equations 7–13 into a system of linear state equations in a matrix form as introduced in EQUATION 16 and 17.

Note that the n variable, represented by reference numbers 1501, 1503, 1505, 1507, 1509, and 1511, in the equation of FIG. 15 represents the number of electron charges per molecule involved in the primary gas reaction at the sensor's electrode. Since the primary gas is different for rich and lean exhaust gas streams, a constant representing the variable n will need to be changed in the model based on the exhaust-ing gas content. Also, the diffusion variable $D_g$ 1513 and 1515 will change based on the primary gas in the UEGO's reaction chamber. In a predominately rich exhaust gas stream $H_2$, CO, and $C_nH_m$ represent the primary gas. Thus, n=2, and $D_g$=4.1×10$^{-3}$ m$^2$/s In a predominately lean exhaust gas stream $O_2$ represents the primary gas. Thus, n=4, and $D_g$=2.1×10$^{-3}$ m$^2$/s Now, a Kalman-Bucy state estimator model can be derived from the equation shown in FIG. 15. Because the Kalman-Bucy state estimator will be executed on a microcontroller, discrete time sampled data will be used. To facilitate this the linear continuous time model of FIG. 15 will be transformed into a model having discrete time sampled variables. This transformation is done in two steps. The first step takes a standard Z transform of the linear state equations shown in FIG. 15. This transforms the linear state equations into a discrete time form for execution on the Motorola MC68332 microcontroller of the engine control system 431.

The discrete time parameters are transformed as follows.

$$A_d = e^{FT_s} \qquad \text{EQUATIONS 19-21}$$

$$B_d = AG$$

$$C_d = C_c$$

where:

$T_s$=time period for sampling—in this case 2 mS
The discrete time model is now:

$$x_d(k+1) = A_d x_d(k) + B_d u(k) \qquad \text{EQUATIONS 22-23}$$

$$y(k) = C_d x_d(k)$$

Note that the subscript d denotes that x is a discrete time variable.

where:

A=represents a coupling between values of the state variables at the present time increment x(k), and the values of the state variables at the next time increment x(k+1)

B=represents gains, or relative influence, of the input on the system variables x C=represents the relative immediate influence of the system variables x on the output signal y k=discrete time index Now, the discrete time model, described in EQUATIONS 22–23 are rewritten to include one sample delay for the convenience of the Kalman-Bucy state estimator.

$$x(k+1) = Ax(k) + Bu(k) \qquad \text{EQUATIONS 24-25}$$

$$y(k) = Cx(k)$$

where:

$$x = \begin{bmatrix} P_{oe} \\ P_{od} \\ I_p \\ V_3 \\ V_4 \\ V_{out} \end{bmatrix} \text{ and}$$

$$A = \begin{bmatrix} 0 & 0\ 0\ 0\ 0\ 0 \\ [B_d] & [\ A_d\ ] \end{bmatrix}$$

-continued $$= \begin{bmatrix} 0 & 0\,0\,0\,0\,0 \\ \begin{bmatrix} b_{11} \\ b_{21} \\ b_{31} \\ b_{41} \\ b_{51} \end{bmatrix} \begin{bmatrix} a_{11}\,a_{12}\,a_{13}\,a_{14}\,a_{15} \\ a_{21}\,a_{22}\,a_{23}\,a_{24}\,a_{25} \\ a_{31}\,a_{32}\,a_{33}\,a_{34}\,a_{35} \\ a_{41}\,a_{42}\,a_{43}\,a_{44}\,a_{45} \\ a_{51}\,a_{52}\,a_{53}\,a_{54}\,a_{55} \end{bmatrix} \end{bmatrix} \text{ and }$$

$$B = \begin{bmatrix} 1 \\ 0 \\ 0 \\ 0 \\ 0 \\ 0 \end{bmatrix}$$

$$C = [0\,0\,0\,0\,0\,1]$$

These equations 24 and 25 are shown in FIG. 8 in general and fully expanded form. Note that the relationships represented by the $a_{nn}$ and $b_{nn}$ matrix members are simply the Z transformed state variable equations represented in FIG. 15. For instance matrix member $a_{22}$ is represented by the following equation.

EQUATION 26

$$a_{22} = e^{\left( \frac{R^2 T^2}{(n^2 F^2 P_{od} \lambda = 1.02 V_d)} \cdot \frac{GR_{12}C_1}{(1-R_1 R_{12} C_1 G)} + \frac{GR_1}{(1-R_1 R_{12} C_1 G)} \right) T_S}$$

Thus $a_{22}$ represents the result of the Z transformation of matrix element $f_{22}$ from FIG. 15. All of the other matrix elements may also be derived in the same manner.

Next, the Kalman-Bucy state estimator stationary optimal filter gains can be computed. The Kalman-Bucy state estimator gain matrix $F_k$ is determined by solving a Riccati equation. This Riccati equation can be solved using various commercially available computer programs. For instance MATRIX$_x$®, available from Integrated Systems, Inc. 3260 Jay Street, Santa Clara, Calif. 95954, or MATLAB®, available from The Math Works, Inc. Cochituate Place 24 Prime Park Way, Natick, Mass. 01760 may be used. After solution, the stationary optimal filter gain $F_k$ is then given by:

$$F_k = MC^T[CMC^T + V]^{-1} \quad \text{EQUATION 27}$$

where:

T=indicates transposition of the matrices $F_k$=gain

M=the matrix solution of the Riccati equation

C=see equations 24–25

V=covariance of measurement noise—at least partially dependent on electrical noise in the DAS conversion process The gains $F_k$ represent the correction to be applied to each of the state estimates per unit of error between the predicted sensor signal and the actual sensor signal. This is the correction mechanism that keeps the estimated values of the state variables ($\hat{x}$) tracking what is actually happening in the system. If the sensor signal is known to be relatively noisy, as signified by a large V, a small correction will be applied if there is an error between the predicted signal value and the sensor reading. Conversely, if the sensor signal is known to be relatively noise free, as signified by a small V, a larger correction will be applied if there is an error between the predicted signal value and the sensor reading. Therefore, the state estimate is a weighted combination of what was expected from the prediction equation, and what is measured from the sensor. The correction mechanism keeps these on track.

In general, a Kalman-Bucy state estimator operates on state vectors. The Kalman-Bucy state estimator provides a best estimate of one or more of these state vectors in the sense of minimizing a squared error from the true state(s). The Kalman-Bucy state estimator relies on a sensor input signal, in this case the UEGO output signal 429, and based on various predetermined state estimation coefficients, provides various output state estimates. In the present embodiment, one of the output state estimates represents a best estimate of the chemical concentration of the oxygen exhausted from each of the exhaust ports.

Preferably, as mentioned above, another input to the Kalman-Bucy state estimator includes a prediction of the chemical concentration of the oxygen exhausted based on a measured air and fuel mass charged into a combustion chamber prior to combustion and exhausting. This additional input enables the Kalman-Bucy state estimator to resolve faster. The update of the new predicted oxygen concentration input to the Kalman-Bucy state estimator iterative calculations, is delayed until the oxygen from the exhausting cylinder propagates from the particular exhausting port to the collection point 420 proximate the UEGO sensor 419. As mentioned earlier, various gas transport related temporal delays, both static and dynamic affect this delay time.

Next, the software steps for executing the preferred method will be described.

FIG. 5 is a software flow chart illustrating the various method steps embedded into the Read Only Memory (ROM) 445 located in the engine control system 431 introduced in FIG. 4. The method steps making up the routine 500, commence at a step 501. This example will be limited to describing the improved method considering two adjacently exhausting cylinders from exhaust bank 1, cylinders #1 and #3. This discussion will include the observation and compensation for the various temporal, spacial, sensor response speed and rich vs. lean problems indicated earlier. Those of ordinary skill in the art will be quick to realize how to extend this example for the remaining cylinders, or for different engine configurations.

In the next step 503, the engine control system 431 determines which cylinder will exhaust next, and waits until the corresponding cylinder's exhaust valve starts to open. In the present example cylinder #4 is currently exhausting and cylinder #1 407 is combusting. Next, cylinder #1 407 will be exhausting. The instantaneous time at which cylinder #1 407 commences its exhausting sequence, is determined by measuring the absolute engine angular position as captured in TPU, or Time Processing Unit, of the microcontroller 441. The TPU is dutied with converting the signals 438 and 440 from pulses to useful digital information as the engine's crankshaft 442 rotates. This includes engine position and speed which are both applied in the improved method and system. Regarding engine position, cylinder #1, 407 will exhaust between 120° and 360° after TDC. This is important to know in order to synchronize the Kalman-Bucy state estimator with each cylinder's exhaust cycle. The exhausting sequence, as measured with respect to engine degrees, is stored in a cylinder sequence parameter table located in the engine control system's 431 ROM 445. A typical 8 cylinder exhaust sequence parameter table follows.

TABLE 2

| CYLINDER | EXHAUSTING |
|---|---|
| 1 | 120°–360° |
| 2 | 390°–630° |
| 3 | 210°–450° |
| 4 | 660°–180° |
| 5 | 570°–90° |

TABLE 2-continued

| CYLINDER | EXHAUSTING |
| --- | --- |
| 6 | 480°–720° |
| 7 | 300°–540° |
| 8 | 30°–270° |

As part of this step 503, the microcontroller indexes and recalls the next exhausting cylinder's position information from the cylinder sequence parameter table and compares it to the absolute engine angular position as captured in the TPU. When the TPU indicates that the engine has reached the next cylinder's exhaust port opening position, in this case cylinder #1 407 at 120° after engine TDC, then the step 505 will execute.

Between 120° and 360° the exhaust port 409, corresponding to cylinder #1 407, will exhaust a stable chemical concentration of exhaust gases. Details of the exhausting process are shown in FIG. 7.

Figure 7:
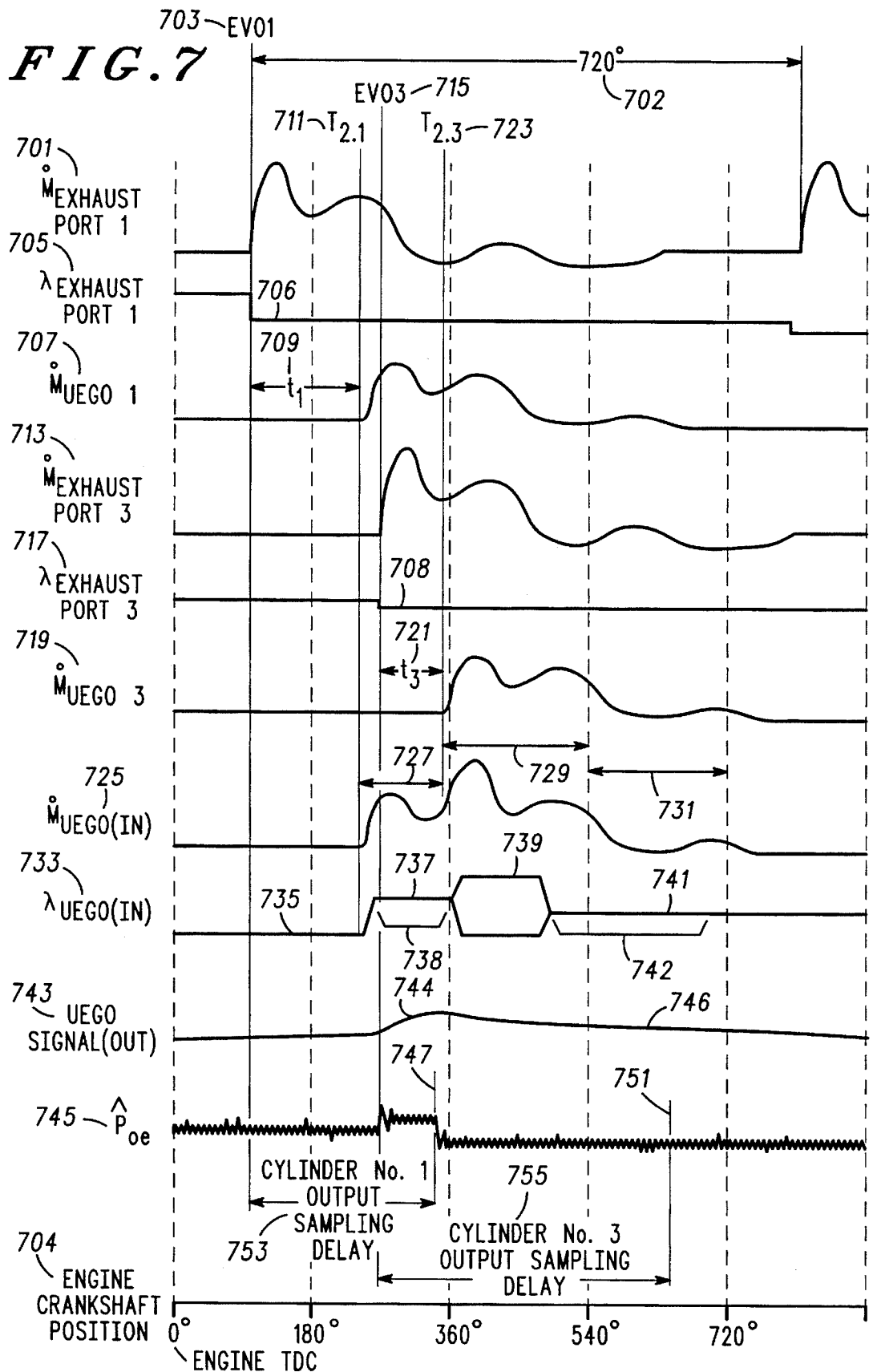
FIG. 7 is a chart illustrating waveforms of various temporal and frequency responses as detailed in the preferred embodiment.

Diverging temporarily to FIGS. 4 and 7, a series of waveforms are shown covering a complete engine cycle of 720° 702. A horizontal axis 704 illustrates engine crankshaft position.

A waveform 701 entitled $\overset{\circ}{M}_{EXHAUST\ PORT\ 1}$ represents a singular flow pulse. This singular flow pulse shows an exhaust mass flowrate emitted from cylinder #1's exhaust port 409. The exhaust port 409 opens as shown at reference number 703 (EVO1) proximate an engine angle of 120° (as predicted from TABLE 2) after engine TDC. The predicted chemical concentration, in this case oxygen concentration, of the exhaust gases are emitted instantaneously. This is shown predicted directly at the exhaust port 409 by another waveform 705 entitled $\lambda_{EXHAUST\ PORT\ 1}$. Note that this waveform 705 transitioned from another value of predicted oxygen, and remains stable until the next engine cycle 720° later, then transitions to another predicted value of oxygen. This example shows different oxygen concentrations emitted from cylinder #1 407 from 3 consecutive combustion cycles.

Waveform 707 $\overset{\circ}{M}_{UEGO1}$ shows a predicted flow pulse at the collection point 420. Notice that the flow pulse 707 results from the flow pulse 701 but is somewhat attenuated and delayed. The delay $t_1$ 709 corresponds to the aforementioned $T_2$ from EQUATION 3 which shows a first approximation of the static gas transport delay between exhaust port #1 dependent on the difference in transmission path length from exhaust port #1 to the UEGO sensor 419 positioned at the collection point 420. Reference number 711 $T_{2,1}$ shows this occurrence relative to engine crankshaft position 704. Note that the attenuation is primarily related to the static flow impedance caused by the exhaust manifold and runner system 417.

Another waveform 713 entitled $\overset{\circ}{M}_{EXHAUST\ PORT\ 3}$ represents a singular flow pulse representing an exhaust mass flowrate emitted from cylinder #3's exhaust port 413. The exhaust port 413 opens as shown at reference number 715 (EVO3) proximate an engine angle of 210° (as predicted from TABLE 2) after engine TDC. As in the case for cylinder #1 407, the predicted chemical concentration of oxygen is emitted instantaneously. This is shown predicted directly at the exhaust port 413 by another waveform 717 entitled $\lambda_{EXHAUST\ PORT\ 3}$. Note that this waveform 717 transitions in a similar manner as waveform 705 $\lambda_{EXHAUST\ PORT\ 1}$.

Waveform 719 $\overset{\circ}{M}_{UEGO3}$ shows a predicted flow pulse at the collection point 420. As shown in the case for cylinder #1 407, the waveform 719 results from the flow pulse 713 but is also somewhat attenuated and delayed. Significantly, note that a delay $t_3$ 721 is shorter than the delay $t_1$ 709 associated with exhausting cylinder #1 407. This is because the exhaust port 413 associated with cylinder #3 411 is positioned to have a shorter path length 418 than the path length 416 associated with the exhaust port 409 of cylinder #1 407. Reference number 723 $T_{2,3}$ shows this occurrence relative to engine crankshaft position 704.

Waveform $\overset{\circ}{M}_{UEGO(in)}$ 725 shows the actual combination of flow pulses $\overset{\circ}{M}_{UEGO1}$ 707 and $\overset{\circ}{M}_{UEGO3}$ 719 at the collection point 420 proximate the UEGO sensor 419. Expectedly, the waveforms $\overset{\circ}{M}_{UEGO1}$ 707 and $\overset{\circ}{M}_{UEGO3}$ 719 are superimposed. A portion 727 of the waveform $\overset{\circ}{M}_{UEGO(in)}$ 725 directly corresponds to the waveform $\overset{\circ}{M}_{UEGO1}$ 707. Notably, another portion 729 of the waveform $\overset{\circ}{M}_{UEGO(in)}$ 725 shows the overlapping combination of the waveforms associated with flow pulses $\overset{\circ}{M}_{UEGO1}$ 707 and $\overset{\circ}{M}_{UEGO3}$ 719. Following this, another portion 731 of the waveform $\overset{\circ}{M}_{UEGO(in)}$ 725 shows the contribution only from waveform $\overset{\circ}{M}_{UEGO3}$ 719.

Resulting from this combined flow pulse $\overset{\circ}{M}_{UEGO(in)}$ 725 is a prediction of the actual oxygen concentration attributable to the exhausting action of cylinders #1 407 and #3 411. This is shown in waveform 733 $\lambda_{UEGO(in)}$. This waveform 733, represents the oxygen concentration at the collection point 420.

Reference number 735 indicates that the waveform 733 $\lambda_{UEGO(in)}$ is reading a steady oxygen concentration from the last exhausting cylinder, in this case cylinder #4. At reference number 703 the exhaust port for cylinder #1 begins to flow new gasses with a new oxygen concentration as shown by the waveform $\lambda_{EXHAUST\ PORT\ 1}$ 705. At reference number 711, this flow pulse has reached the sensor and has begun to affect the sensor output. After a period, the oxygen concentration stabilizes, as shown by reference number 737. Reference number 738 represents an interval where the chemical concentration of oxygen at the collection point 420 steadily approaches a substantially stable value, in this case the value represented by reference number 706, for exhausting cylinder port 409. Essentially, the intervals commence when the gas exhausted is present at the collection point in a stable chemical concentration.

Continuing, at reference number 739, the oxygen concentration at the collection point 420 again becomes unstable and unpredictable because the flow pulse attributable to cylinder #3 411 starts to blow-off the oxygen concentration associated with cylinder #1 407. At the same time there is still active flow from cylinder #1 at the sensor shown by waveform 707. This overlapping flow mixes the exhaust gases from cylinders #1 and #3 so that the oxygen concentration at the sensor is unsteady. Later, as shown at reference number 741, after the flow pulse from cylinder #1 has died out thus ending the flow overlap, the oxygen concentration again stabilizes. Here, reference number 742 represents an interval where the chemical concentration of oxygen at the collection point 420 steadily approaches a substantially stable value, in this case the value represented by reference number 708, for exhausting cylinder port 413.

A waveform entitled UEGO$_{SIGNAL(out)}$ 743 illustrates the signal 429 provided by the UEGO sensor 419 in response to oxygen concentration provided in the combined exhaust gas flow represented as predicted by the $\lambda_{UEGO(in)}$ waveform 733. Notice that, as predicted, the UEGO$_{SIGNAL(out)}$ 743 does not accurately reflect the predicted oxygen concentration 737 and 741 actually emitted from the respective exhaust ports 409 and 413. Expressly, a signal level 744 never quite reaches equivalence with the signal level 737, exhausted from exhaust port 1 409. Likewise, a signal level 746 never quite reaches equivalence with the signal level 741, exhausted from exhaust port 3 413. Principally, this is the result of the inherently slow response of the UEGO sensor 419.

Finally, as shown at reference number 745, a $\hat{P}_{oe}$ waveform represents a reconstructed signal indicative of the chemical concentration of the oxygen exhausted from each of the exhaust ports 409 and 413. This signal is produced internal to the microcontroller 441 through the execution of the method steps, including the Kalman-Bucy state estimator, shown in FIGS. 5 and 6. Significantly, a signal level 747 reaches substantial equivalence with the signal level 737, exhausted from exhaust port 1 409. Likewise, a signal level 751 reaches substantial equivalence with the signal level 741, exhausted from exhaust port 3 413. Note that reference number 753 denotes an output sampling delay time associated with cylinder #1. Also, reference number 755 denotes an output sampling delay time associated with cylinder #3. These output sampling delay times are introduced to enable the state estimates, for instance $\hat{P}_{oe}$, produced by the Kalman-Bucy state estimator to converge to a mostly steady and substantially stable value before they are posted to the engine control strategy. These output sampling delays are discussed further in the description of the flow chart in FIG. 5 below.

Returning to FIG. 5, in step 505 an output sampling delay timer is started. This output sampling delay timer is used to compensate for various temporal delays associated with the individual exhausting cylinders.

In step 507, an estimated air charge mass, fuel charge mass, and engine speed are determined for the presently exhausting cylinder (cylinder #1 407). These parameters are provided by an engine control strategy external to this routine 500. Air charge mass is essentially the value of mass of air inducted into the cylinder prior to combustion. Fuel charge mass is representative of a fuel charge injected into the pre-combusting cylinder by a fueling strategy operating on the engine control platform 431. Engine speed is simply derived from the engine angular displacement signal 440. Those of ordinary skill in the art will recognize many approaches in contemporary engine control strategies for providing the estimated air charge mass, fuel charge mass and engine speed.

Next, in step 509, a predicted exhaust oxygen concentration is computed from the provided air charge mass and fuel charge mass state estimates for the active cylinder. This is accomplished by executing the following algebraic equation on the Motorola MC68332 microcontroller 441.

EQUATION 27

$$\overline{P}_{oe} = \frac{(\lambda - 1) \cdot \left(a + \frac{b}{4}\right)}{a + \frac{b}{2} + \lambda\psi \cdot \left(a + \frac{b}{4}\right) + (\lambda - 1) \cdot \left(a + \frac{b}{4}\right)}$$

where:

$\psi$=Molar ratio of Nitrogen to Oxygen in air, 3.773 a, b=constants dependent on type of fuel, where (a) represents the mean number of Carbon atoms/molecule of fuel, and (b) represents the mean number of Hydrogen atoms/molecule of fuel $$\lambda = \frac{(\text{air\_mass/fuel\_mass})}{\text{stochiometric(air\_mass/fuel\_mass)ratio}}$$

Next, in step 511 the predicted exhaust oxygen concentration $\overline{P}_{oe}$ is saved as an input estimate (u') and will be used by the Kalman-Bucy state estimator. As mentioned above this input estimate u' is used to enable the Kalman-Bucy state estimator to resolve faster. However, this input estimate u' is optional.

In the next step 513, the microcontroller 441 determines an output sampling delay from a table related to the exhausting cylinder. Essentially, this output sampling delay is introduced so that the Kalman-Bucy state estimator has as much time available for resolving its state variables before the next cylinder's flow pulse interferes with the gas concentration at the collection point 420. This means that just before a change occurs at the UEGO sensor output, responsive to a new gas mixture at the collection point 420, the oxygen concentration $\hat{P}_{oe}$ 745 signal reconstructed by the Kalman-Bucy state estimator, will be highly correlated to the actual oxygen output of the exhausting cylinder, and less correlated with the oxygen output of other cylinders.

Momentarily referring back to FIG. 7 at reference number 753 an output sampling delay for cylinder #1 is shown. As mentioned above, this time is dependent on gas transport delays related to exhaust manifold runner lengths and engine speed and load. For instance as engine speed increases the time interval separating successive cylinder exhaust decreases. This causes the UEGO sensor output signal (y) 429 to become less distinct because it does not have time to settle before another cylinder's oxygen output influences its value. The output sampling delays are different for each cylinder having a different path length between its exhaust port and the UEGO sensor, and/or on some engines, a different angular interval before the next exhaust pulse in the sequence. The output sampling delays are also dependent on engine load and engine speed. Engine load is measured indirectly by measuring the absolute pressure of air in the intake manifold. Engine speed is simply derived from the engine angular displacement signal 440. Predetermined output sampling delay times are stored in another parameter table located in the engine control system's 431 ROM 445. An example of an output sampling delay table follows.

The following table represents output sampling delays associated with cylinder #1 407. Note that these are empirically determined and are represented in terms of engine angular displacement rather than units of time. This is simply to show that the output sampling delays, or for that matter the later described input estimate delays, may be represented in terms of angular displacement. The microcontroller 441 can easily keep track of engine angular displacement to effect this delay.

TABLE 3

| air mass (kg) | engine speed (RPM) | | |
|---|---|---|---|
| | 800 | 1600 | 2400 |
| 1.00E-05 | 300° | 300° | 300° |
| 2.00E-05 | 200° | 230° | 150° |
| 3.00E-05 | 140° | 170° | 140° |
| 4.00E-05 | 140° | 170° | 140° |

A chart representing a continuum of output sampling delays associated with cylinder #1 407 is included in FIG. 12 for convenience. The following table represents output sampling delays associated with cylinder #3 411.

TABLE 4

| air mass (kg) | engine speed (RPM) | | |
|---|---|---|---|
| | 800 | 1600 | 2400 |
| 1.00E-05 | 310° | 310° | 310° |
| 2.00E-05 | 240° | 260° | 210° |
| 3.00E-05 | 210° | 230° | 200° |
| 4.00E-05 | 210° | 230° | 200° |

Since an inherent time delay is present between the time an exhaust valve opens and when the flow pulse from the exhausting cylinder is available at the UEGO sensor, an input delay must be introduced so that the above-mentioned input estimate (u') is provided coincident with the change of the sensor signal (y) from the corresponding exhausting cylinder. In step 514 the microcontroller 441 determines and loads input estimate delay coefficients into a delay stage of the Kalman-Bucy state estimator. Just as in the above-mentioned case of output sampling delay times these coefficients are empirically determined and are different for each cylinder having a different path length between its exhaust port and the UEGO sensor. Also, the input delay times are also dependent on engine load and engine speed. These coefficients are stored in another table located in the engine control system's 431 ROM 445. A chart representing a continuum of input estimate time delays associated with cylinder #1 407 is included in FIG. 11 for convenience.

The following table, derived from the chart in FIG. 11, illustrates the input estimate time delay associated with cylinder #1 407 as a function of speed and load, where load is measured by air charge mass. Input estimate time delay associated with other cylinders may be charted in a similar manner.

TABLE 5

| air mass (kg) | engine speed (RPM) | | |
|---|---|---|---|
| | 800 | 1600 | 2400 |
| 1.00E-05 | 50 mS | 25 mS | 12 mS |
| 2.00E-05 | 25 mS | 16 mS | 6 mS |
| 3.00E-05 | 12 mS | 10 mS | 4 mS |
| 4.00E-05 | 12 mS | 10 mS | 4 mS |

Next, in step 515, the microcontroller 441 waits for the output sampling delay, determined in step 513, to correspond to the running output sampling delay timer initiated in step 505. When the output sampling delay expires, then step 517 is executed. Input estimate delays and output sampling delays may also depend on exhaust runner geometry's. Of particular importance is the cross-sectional area of the exhaust runner. As the runner cross-sectional area varies the flow impedance and thus the time it takes for a flow pulse to transit the distance between the exhausting port and the common collection point will vary. A model of this geometrical aspect of the engine may be encoded into a table accessible by the microcontroller 441. Subsequently, the input estimate delays and output sampling delays can also depend on this geometric model.

In step 517 the microcontroller 441 reads the state estimates posted by the independently executing Kalman-Bucy state estimator, including a corrected oxygen concentration estimate $\hat{P}_{oe}$.

In the next step, 519 the microcontroller 441 determines a normalized air-fuel ratio, $\hat{\lambda}$ based on the corrected oxygen concentration estimate $\hat{P}_{oe}$ for the exhausting cylinder. This air-fuel ratio estimate is then provided to the externally executing engine control strategy. The determination of $\hat{\lambda}$ is dependent on whether the corrected oxygen concentration estimate is representing lean or rich exhaust. The determination of $\hat{\lambda}$ can be expressed as follows.

for lean exhaust gas $(\hat{P}_{or} > 0) \ldots$      EQUATION 28-29

$$\hat{\lambda} = \frac{-\left(\frac{a+\frac{b}{4}}{a+\frac{b}{2}}\right)}{\hat{P}_{oe}(\psi+1) - \left(\frac{a+\frac{b}{4}}{a+\frac{b}{2}}\right)}$$

and for rich exaust gas $(\hat{P}_{oe} < 0) \ldots$ $$\hat{\lambda} = \frac{\hat{P}_{oe}\left(\left(\frac{a}{a+\left(\frac{b}{4}\right)}\right) - 2\right) - 4}{\hat{P}_{oe}\psi + 4}$$

where:

ψ=Molar ratio of Nitrogen to Oxygen in air, 3.773 a, b=constants dependent on type of fuel, where (a) represents the mean number of Carbon atoms/molecule of fuel, and (b) represents the mean number of Hydrogen atoms/molecule of fuel After this, the method steps 500 repeat starting at step 503 anticipating the next exhausting cylinder.

Next, a detailed view of the Kalman-Bucy state estimation process will be introduced.

FIG. 6 illustrates method steps used to implement a Kalman-Bucy state estimator for reconstructing the oxygen concentration in the exhaust gases from the provided UEGO signal 429. Routine 600 runs independently from the routine 500 described earlier. It is invoked every 2 mS by a free running periodic timer. 2 mS was chosen based on an analysis to provide for a high fidelity system. This counter is implemented in software, or optionally in hardware. The software associated with the method steps in this routine 600 is encoded into the ROM 445 located in the engine control system 431.

The routine 600 is started at step 601. In step 603, the input estimate (u') representing the predicted exhaust oxygen concentration, originally saved in step 511 of FIG. 5, is read into the Kalman-Bucy state estimator.

Next, in step 605, the UEGO sensor output signal (y), provided from the DAS 449, is also read into the Kalman-Bucy state estimator.

Note that the Kalman-Bucy state estimation process continually receives the UEGO sensory signal (y). As mentioned above, since an inherent time delay is present between the time an exhaust valve opens and when a stable oxygen output of the exhausting cylinder is available at the UEGO sensor, the aforementioned input delay is introduced such that the input estimate (u') is provided coincident with the sensory signal (y) from the corresponding exhausting cylinder. This is accomplished in step 607, where the input estimate (u') is delayed, by the input estimate delay time predetermined in step 514, to compensate for the aforementioned temporal effects including propagation delays caused by exhaust manifold geometry, and engine speed and load effects described earlier. Essentially, the input estimate delay time expires at the commencement of each of the intervals and indicates that the oxygen is stable at the collection point. Optionally, the input estimate delay time can be chosen to include the response of the UEGO sensor and thus the input estimate delay time expires at a time after the commencement of each of the intervals.

Diverging to FIG. 10 momentarily, a tapped delay line 1000, which represents the delay stage of the Kalman-Bucy state estimator mentioned in step 514 of routine 500 described in FIG. 5, is shown. This tapped delay line 1000 architecture is common in DSP implementations. This tapped delay line 1000 may be emulated either in hardware or in software. The tapped delay line 1000 is constructed using unit step delays, two of which are represented by reference numbers 1001 and 1013. Delay coefficient blocks, represented by reference numbers 1003 and 1019, provide the results of the unit step delay outputs to a summation block 1005. This coupling is shown by reference numbers 1011 and 1021. The operation of the tapped delay line 1000 is described as follows. Initially, a matrix of delay coefficients is loaded into the delay coefficient blocks, represented by reference numbers 1003 and 1019. The general format for this matrix is as follows.

$$u(k)=C_d[u'(k-1) \ldots u'(k-n)]^T \quad \text{EQUATION 30}$$

The matrix of delay coefficients $C_d$ was provided in step 514 of FIG. 5. For example, if cylinder #1 is exhausting then the input estimate delay time, at an engine speed of 1600 RPM and an engine load represented by an air charge mass of 4.00E-05 kg's, is 10 mS. This is taken from TABLE 4 mentioned earlier. Since the counter has a 2 mS time base the matrix of delay coefficients will be:

$$[0\ 0\ 0\ 0\ 1\ \ldots\ 0] \quad \text{MATRIX 1}$$

Therefore after 5 unit step delays of 2 mS each, 10 mS have expired and u'(k), input at reference number 1007, exits the summation block 1005 as u(k) at reference number 1009.

Returning to FIG. 6, in step 609 a rich, or lean burn condition is determined from the previous estimate of oxygen concentration $\hat{P}_{oe}$ from the particular exhausting cylinder. This determination can be made using other techniques.

One technique is to determine a rich or lean condition simply by comparing the UEGO signal 429 to a predetermined threshold based on stoichiometry. Thus, if the signal 429 exceeds the threshold the sensor would be sensing lean gases.

Alternatively, an estimate of partial pressure of $H_2$ $\hat{P}_{He}$, and/or CO $\hat{P}_{COe}$, in the exhaust gas may be used to determine a rich or lean condition.

As mentioned earlier, deterministic relationships, and empirical validation have shown that for rich gases the sensory response is significantly slower than for lean gases. In order to accurately transform the signal 429 provided by the UEGO sensor 419 that has had its higher frequency information significantly attenuated, the compensation for rich vs. lean sensor response is vital. Once determined, certain state estimator coefficients are selected, based on whether the determination was rich or lean. These certain state estimator coefficients include A and $F_k$, as mentioned above and referenced in FIGS. 8 and 14, and equations 24–25.

Next, the actual Kalman-Bucy state estimator matrix equations and a discussion of their implementation will be introduced in method step 611.

Figure 14:
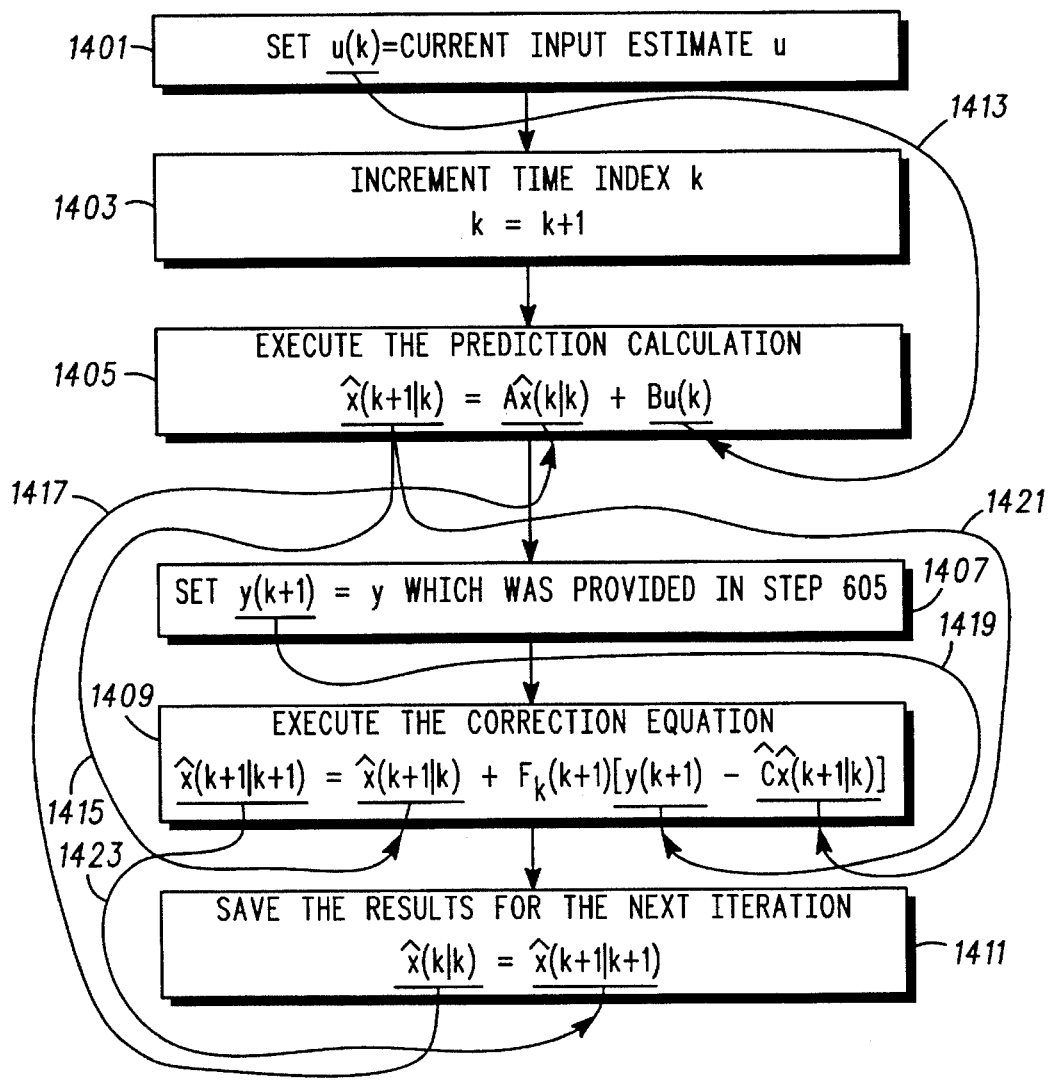
FIG. 14 is a software flow chart for illustrating various method steps associated with the Kalman-Bucy state estimator.

In step 611 the Kalman-Bucy state estimator is iterated. As mentioned above these Kalman-Bucy state estimator calculations are completed every 2 mS to reconstruct the $\hat{P}_{oe}$, and other state estimates, for the exhausting cylinder of interest based on the corresponding inputs (u) and (y), and the matrices A, B, C, and $F_k$ representing the engineering model of the UEGO sensor. Details of the method steps associated with this iteration are shown in FIG. 14. However, before delving into the details of the method it would be instructive to review a model of the system for reconstruction of the oxygen concentration as described hereto.

Figure 16:
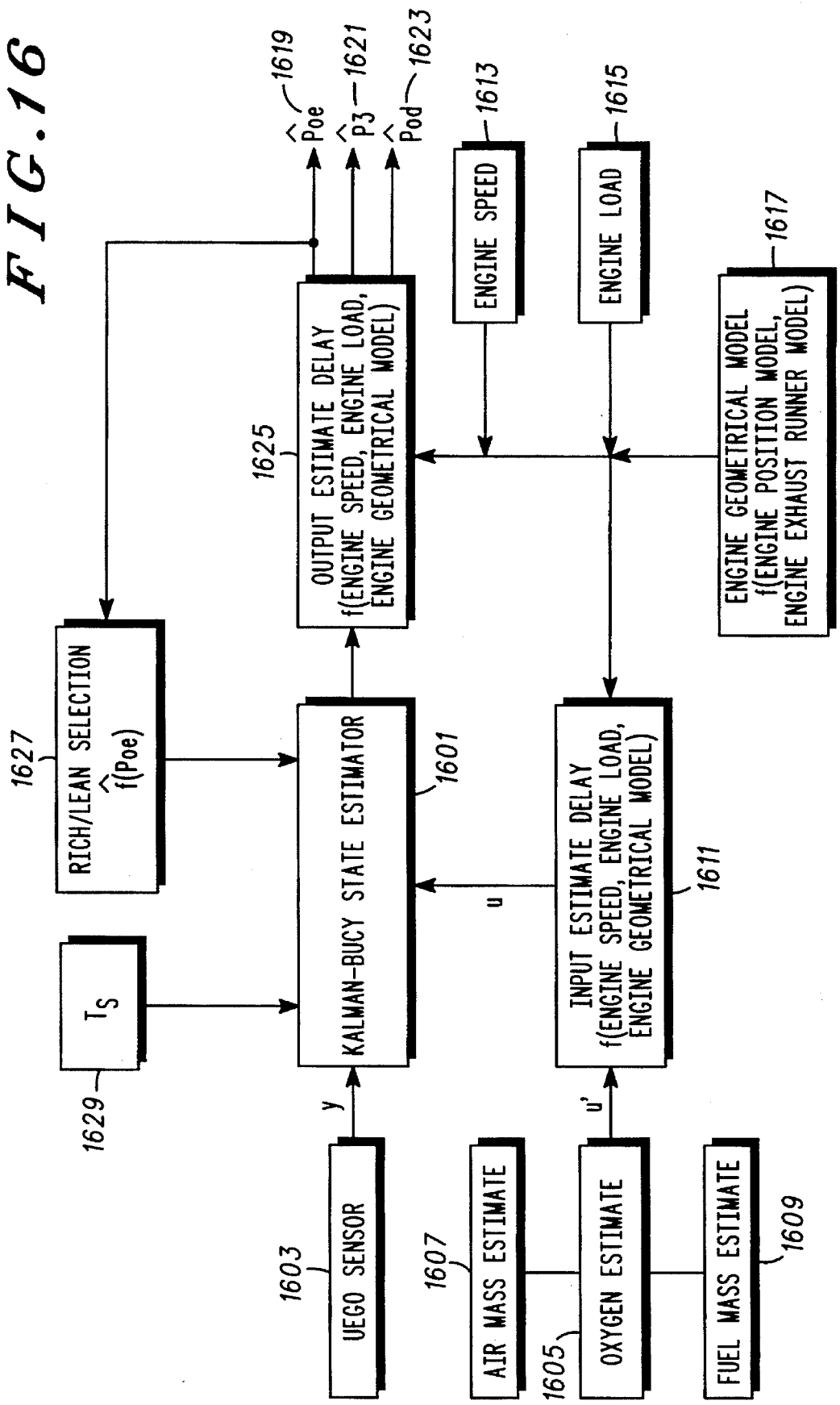
FIG. 16 is a system block diagram illustrating the signal reconstruction means.

FIG. 16 illustrates a system diagram of the improved method in block form. This system diagram represents a signal reconstruction means that is a summary of the above teaching. A Kalman-Bucy state estimator block 1601 receives an input (y) from a UEGO sensor block 1603. The signal (y) represents a signal from the collection point 420 $\lambda_{UEGO(in)}$ 733 earlier shown in FIG. 7. This is the signal to be reconstructed. Optionally, another input (u) is derived from an oxygen concentration prediction block 1605 (u'). This variable (u') is predicted from the result of an air mass estimate block 1607, and a fuel mass estimate block 1609. These air and fuel mass estimates are associated with every exhausting cylinder. The input (u) is derived from the prediction (u') by delaying its arrival to the Kalman-Bucy state estimator block 1601 by an input estimate delay time. This input estimate delay time is shown in block 1611 and is a function of engine speed 1613, engine load 1615, and an engine geometric model 1617 including an engine positional model and an engine exhaust runner model. The engine positional model simply identifies the relationships between the exhausting events shown originally in FIG. 3. The engine exhaust runner model accounts for the aforementioned gas transport effects introduced above. Certain engineering matrix coefficients, described above and shown by block 1627, are chosen as a function of the predicted oxygen $\hat{P}_{oe}$ 745, or optionally, by other state variables internal to the Kalman-Bucy state estimator block 1601. Outputs 1619, 1621, and 1623 of the Kalman-Bucy state estimator 1601 are sampled responsive to an aforementioned output sampling delay. This output sampling delay is represented by block 1625. A system timer $T_s$, shown by block 1629 triggers the Kalman-Bucy state estimator 1601 every 2 mS as described earlier. Given the above overview the Kalman-Bucy state estimator used to reconstruct the oxygen concentration from each exhaust port will be described.

Referring to FIG. 14, in step 1401 the present input estimate, provided from the input estimate delay process shown in FIG. 10, u(k) is read into the estimator. This input estimate represents the aforementioned predicted exhaust oxygen concentration $\bar{P}_{oe}$ derived in EQUATION 27, delayed by the input estimate delay time associated with the exhausting cylinder presently causing the generation of the UEGO sensor signal y 429. Next, in step 1403 the time index of the Kalman-Bucy state estimator is incremented.

Then, in step 1405 the Kalman-Bucy state estimator prediction equation is executed. Instructively, data flow of the variable (u) is shown by reference number 1413. Note that the prediction equation is shown here in general form. Actually, the prediction equation represented in FIG. 8 is executed on the microcontroller 441.

Next, in step 1407 the UEGO signal (y) 429 is read for the present time index.

Then, step 1409, the correction step, is executed. When the UEGO signal (y) and the prediction result are made available, the predicted readings are subtracted from the actual readings to obtain a prediction error. The prediction error is then multiplied by the gain matrix $F_k$ to produce a correction which is then added to the state estimates of the dynamic variables $\hat{x}$. The result of the mathematical process produces state estimates of the dynamic variables $\hat{P}_{oe}, \hat{P}_{od}, \hat{I}_p, \hat{V}_3, \hat{V}_4, \hat{V}_{out}$. Data flow of the predicted state variables is shown by reference numbers 1415 and 1421. Also, data flow of the time indexed UEGO sensor output signal (y) 429 is shown by reference number 1419. Note that the correction equation is also shown here in general form. The correction equation represented in FIG. 9 is executed on the microcontroller 441.

Then, in step 1411 the results of the correction equation iteration are stored for use in the next iteration of the Kalman-Bucy state estimator. Note the data flow represented by reference number 1417 and 1423.

Returning to FIG. 6, in step 613 the microcontroller 441 waits for the next 2 mS clock from the free running timer.

In step 615 various state estimates are posted to be used by the engine control strategy. These state estimates may include state estimates for the concentration of oxygen in the UEGO sensor's detection cavity, the pumping current, and the concentration of oxygen in the exhaust gas stream. By monitoring or tracking concentration of oxygen in the UEGO sensor's detection cavity, which is a variable located internal to the UEGO sensor, the changes in the UEGO output signal can be better interpreted. This allows the reconstruction of fast changes in exhaust stream oxygen concentration $\hat{P}_{oe}$ from a relatively slowly changing signal (y). The routine 600 then repeats starting at step 603.

The result of the method steps found in the routines 500 and 600 is a reconstructed signal $\hat{P}_{oe}$ that has a substantially constant amplitude during the fixed interval of the particular exhausting cylinder.

In summary, an improved method, and system, for measuring gas chemistry of a combined gas stream exhausted from a multi-cylinder internal combustion engine has been detailed. The improved approach effectively compensates for the static and dynamic temporal and spacial effects, characteristic of a multi-cylinder engine exhaust system, the sensor frequency response limitations and the difference in sensory response to rich and lean exhaust gases, of a UEGO gas chemistry sensor. This approach is particularly beneficial because it applies a singular sensor to sense and provide individual air-fuel ratio estimates to an engine control strategy while compensating for a complex system configuration. Also, as mentioned earlier, the disclosed method and system, can be also applied to measuring other exhaust gas types without departing from the essential teaching detailed here. Further, with the appropriate model, other variables associated with the sensor behavior may be measured. In the present embodiment these include the concentration of oxygen in the UEGO sensor's detection cavity and the pumping current. Others will quickly realize the power of this approach as applied to UEGO sensors and other types sensors.

What is claimed is:

1. A system for measuring a chemical concentration of a gas exhausted during exhaust cycles from a plurality of exhaust ports of a multi-cylinder internal combustion engine, said system comprising:

a gas chemistry sensor, responsively coupled to the collection point, for measuring the gas exhausted from each of the plurality of exhaust ports and for providing a sensory output signal dependent thereon; and a state estimator, comprising state estimation coefficients associated with an engineering model of said gas chemistry sensor, the state estimator responsively coupled to the sensory output signal provided by said gas chemistry sensor, wherein said state estimator provides a constituent gas signal in response to the sensory output signal.

2. A system in accordance with claim 1 wherein said signal reconstruction means comprises a periodic timer, wherein said state estimation means is iterated responsive to the periodic timer, and wherein progressive iterations within each of the intervals provides a constituent gas signal converging towards an amplitude indicative of the stable chemical concentration of the gas exhausted during each of the intervals of engine angular rotation corresponding to the exhaust cycles.

3. A system in accordance with claim 1 wherein said signal reconstruction means further comprises means for determining an output sampling delay time from the commencement of each of the plurality of exhaust cycles, and wherein said signal reconstruction means provides the constituent gas signal coincident with an expiration of the output sampling delay time.

4. A system in accordance with claim 3 wherein the output sampling delay time is different for at least two of the plurality of exhaust cycles.

5. A system in accordance with claim 4 wherein said signal reconstruction means determines a normalized air-fuel ratio dependent on the determined constituent gas signal.

6. A system in accordance with claim 3 wherein each of the output sampling delay times are dependent on an exhaust runner path length between each of the at least two of the plurality of exhaust ports and the collection point.

7. A system in accordance with claim 3 wherein said means for determining an output sampling delay time comprises engine angular displacement determination means for determining which exhaust port of the plurality of exhaust ports of said multi-cylinder internal combustion engine is exhausting, and wherein said output sampling delay time is dependent on a geometric model of the determined exhausting port.

8. A system in accordance with claim 3 wherein said means for determining an output sampling delay time comprises means for determining engine speed and wherein said output sampling delay time is dependent on the determined engine speed.

9. A system in accordance with claim 3 wherein said means for determining an output sampling delay time comprises means for determining engine load and wherein said output sampling delay time is dependent on the determined engine load.

10. A system in accordance with claim 9 wherein said means for determining engine load comprises means for determining an air charge mass associated with a combustion process preceding each of the plurality of exhaust cycles.

11. A system in accordance with claim 10 wherein said means for determining air charge mass comprises a mass air flow sensor.

12. A system in accordance with claim 10 wherein said means for determining air charge mass comprises an absolute pressure sensor.

13. A system in accordance with claim 3 wherein said output sampling delay time is dependent on an integer multiple of the periodic timer.

14. A system in accordance with claim 1 wherein said signal reconstruction means further comprises means for predicting an exhaust gas oxygen concentration independent of said state estimation means, wherein the independently predicted exhaust gas oxygen concentration is provided as an a priori input to said state estimation means, and wherein responsive to the independently predicted exhaust gas oxygen concentration and the sensory output signal, provided by said gas chemistry sensory means, the signal reconstruction means provides a constituent gas signal that has an amplitude indicative of the stable chemical concentration of the gas exhausted during the intervals of engine angular rotation corresponding to the exhaust cycles.

15. A system in accordance with claim 14 further comprising engine control means for providing a fuel charge mass associated with a combustion process preceding each of the exhaust cycles, wherein said exhaust gas oxygen concentration is predicted dependent on the fuel charge mass.

16. A system in accordance with claim 15 wherein said exhaust gas oxygen concentration is predicted dependent on an air charge mass associated with a combustion process preceding each of the exhaust cycles.

17. A system in accordance with claim 14 wherein said signal reconstruction means further comprises means for determining an input estimate delay time from the commencement of each of the plurality of exhaust cycles, and wherein said signal reconstruction means provides the independently predicted exhaust gas oxygen concentration to said state estimation means coincident with an expiration of the input estimate delay time.

18. A system in accordance with claim 17 wherein said input estimate delay time expires at the commencement of each of the intervals.

19. A system in accordance with claim 17 wherein the input estimate delay time is different for at least two of the plurality of exhaust cycles.

20. A system in accordance with claim 17 wherein each of the input estimate delay times are dependent on an exhaust runner path length between each of the at least two of the plurality of exhaust ports and the collection point.

21. A system in accordance with claim 17 wherein said means for determining an input estimate delay time comprises engine angular displacement determination means for determining which exhaust port of the plurality of exhaust ports of said multi-cylinder internal combustion engine is exhausting, and wherein said input estimate delay time is dependent on a geometric model of the determined exhausting port.

22. A system in accordance with claim 17 wherein said means for determining an input estimate delay time comprises means for determining engine speed and wherein said input estimate delay time is dependent on the determined engine speed.

23. A system in accordance with claim 17 wherein said means for determining an input estimate delay time comprises means for determining engine load and wherein said input estimate delay time is dependent on the determined engine load.

24. A system in accordance with claim 23 wherein said means for determining engine load comprises means for determining an air charge mass associated with a combustion process preceding each of the plurality of exhaust cycles.

25. A system in accordance with claim 17 wherein said input estimate delay time is dependent on an integer multiple of the periodic timer.

26. A system in accordance with claim 1 wherein a different set of state estimation coefficients are selected responsive to a predetermined influence associated with the gas exhausted, and wherein, responsive to the selection of said different set of state estimation coefficients, said state estimation means provides the constituent gas signal.

27. A system in accordance with claim 26 wherein the influence associated with the gas exhausted corresponds to an amplitude of the constituent gas signal.

28. A system in accordance with claim 27 wherein rich state estimation coefficients are selected responsive to a first amplitude of the constituent gas signal, and a lean state estimation coefficients are selected responsive to a second amplitude of the constituent gas signal, wherein the sensory output signal of said gas chemistry sensory means is reconstructed in accordance with the selected state estimation coefficients and the constituent gas signal is provided in responsive thereto.

29. A system in accordance with claim 26 wherein said engineering model of said gas chemistry sensory means includes a model of said sensory means behavior associated with sensing hydrogen in said gas exhausted, and wherein the influence associated with the gas exhausted corresponds to the measurement of hydrogen.

30. A system in accordance with claim 26 wherein said engineering model of said gas chemistry sensory means includes a model of said sensory means behavior associated with sensing carbon monoxide in said gas exhausted, and wherein the influence associated with the gas exhausted corresponds to the measurement of carbon monoxide.

31. A system in accordance with claim 1 wherein another output signal, associated with the engineering model and distinct from the constituent gas signal is provided.

32. A system in accordance with claim 31 wherein said engineering model of said gas chemistry sensory means includes a model of said sensory means behavior associated with sensing hydrogen in said gas exhausted, and wherein the another output signal is representative of the hydrogen content in the gas exhausted.

33. A system in accordance with claim 31 wherein said engineering model of said gas chemistry sensory means includes a model of said sensory means behavior associated with sensing carbon monoxide in said gas exhausted, and wherein the another output signal is representative of the carbon monoxide content in the gas exhausted.

34. A system in accordance with claim 1 wherein said gas chemistry sensory means comprises an oxygen sensor and the constituent gas signal is oxygen concentration of said gas exhausted.

35. A system in accordance with claim 34 wherein said signal reconstruction means determines a normalized air-fuel ratio dependent on the determined constituent gas signal.

36. A system in accordance with claim 1 wherein said gas chemistry sensory means comprises a Universal Exhaust Gas Oxygen sensor, wherein said engineering model of said gas chemistry sensory means includes a model of said sensory means behavior associated with sensing partial pressure of oxygen in the detecting cavity, and wherein the another output signal is representative of the partial pressure of oxygen in the detecting cavity dependent on the gas exhausted.

37. A system for measuring a chemical concentration of a gas exhausted during exhaust cycles from a plurality of exhaust ports of a multi-cylinder internal combustion engine, said system comprising:

gas chemistry sensory means, responsively coupled to the plurality of exhaust ports, for measuring the gas exhausted from each of the plurality of exhaust ports and for providing a linear sensory output signal responsive thereto;

means for determining an output sampling delay time associated with each of the plurality of exhaust cycles;

signal reconstruction means, responsively coupled to the linear sensory output signal, for providing a constituent gas signal coincident with an expiration of the output sampling delay time, wherein the constituent gas signal has an amplitude indicative of the gas exhausted during each of the exhaust cycles.

38. A system in accordance with claim 37 wherein the output sampling delay time is different for at least two of the plurality of exhaust cycles.

39. A system in accordance with claim 38 wherein said means for determining an output sampling delay time comprises engine angular displacement determination means for determining which exhaust port of the plurality of exhaust ports of said multi-cylinder internal combustion engine is exhausting, and wherein said output sampling delay time is dependent on a geometric model of the determined exhausting port.

40. A system in accordance with claim 39 wherein said means for determining an output sampling delay time comprises means for determining engine speed and wherein said output sampling delay time is dependent on the determined engine speed.

41. A system in accordance with claim 40 wherein said means for determining an output sampling delay time comprises means for determining engine load and wherein said output sampling delay time is dependent on the determined engine load.

42. A system in accordance with claim 41 wherein said signal reconstruction means comprises state estimation means, wherein said state estimation means includes state estimation coefficients associated with an engineering model of said gas chemistry sensory means and wherein said state estimation means provides the constituent gas signal in response to the sensory output signal.

43. A system in accordance with claim 42 wherein said signal reconstruction means further comprises means for predicting an exhaust gas oxygen concentration independent of said state estimation means, wherein the independently predicted exhaust gas oxygen concentration is provided as an a priori input to said state estimation means, and wherein responsive to the independently predicted exhaust gas oxygen concentration and the sensory output signal, provided by said gas chemistry sensory means, the signal reconstruction means provides a constituent gas signal having an amplitude indicative of the gas exhausted during each of the exhaust cycles.

44. A system in accordance with claim 43 wherein said signal reconstruction means further comprises means for determining an input estimate delay time from the commencement of each of the plurality of exhaust cycles, and wherein said signal reconstruction means provides the independently predicted exhaust gas oxygen concentration to said state estimation means coincident with an expiration of the input estimate delay time.

45. A system in accordance with claim 44 wherein said input estimate delay time expires at the commencement of each of the intervals.

46. A system in accordance with claim 45 wherein the input estimate delay time is different for at least two of the plurality of exhaust cycles.

47. A system in accordance with claim 46 wherein said means for determining an input estimate delay time comprises engine angular displacement determination means for determining which exhaust port of the plurality of exhaust ports of said multi-cylinder internal combustion engine is exhausting, and wherein said input estimate delay time is dependent on a geometric model of the determined exhausting port.

48. A system in accordance with claim 47 wherein said means for determining an input estimate delay time comprises means for determining engine speed and wherein said input estimate delay time is dependent on the determined engine speed.

49. A system in accordance with claim 48 wherein said means for determining an input estimate delay time comprises means for determining engine load and wherein said input estimate delay time is dependent on the determined engine load.

50. A system in accordance with claim 49 wherein said means for determining engine load comprises means for determining an air charge mass associated with a combustion process preceding each of the plurality of exhaust cycles.

51. A system in accordance with claim 42 wherein a different set of state estimation coefficients are selected responsive to a predetermined influence associated with the gas exhausted, and wherein, responsive to the selection of said different set of state estimation coefficients, said state estimation means provides the constituent gas signal.

52. A system in accordance with claim 51 wherein the influence associated with the gas exhausted corresponds to an amplitude of the constituent gas signal.

53. A system in accordance with claim 52 wherein rich state estimation coefficients are selected responsive to a first amplitude of the constituent gas signal, and a lean state estimation coefficients are selected responsive to a second amplitude of the constituent gas signal, wherein the sensory output signal of said gas chemistry sensory means is reconstructed in accordance with the selected state estimation coefficients and the constituent gas signal is provided in responsive thereto.

54. A method for measuring a chemical concentration of a gas exhausted during exhaust cycles from a plurality of exhaust ports of a multi-cylinder internal combustion engine, wherein the gas exhausted is present at a collection point in a stable chemical concentration during intervals of engine angular rotation corresponding to the exhaust cycles, said method comprising the steps of:

measuring the gas exhausted from each of the plurality of exhaust ports present at the collection point, and for providing a sensory output signal that, during the intervals of engine angular rotation, approaches a value representative of the stable chemical concentration of the gas exhausted; and reconstructing the stable chemical concentration of the gas exhausted from the sensory output signal provided in said step of measuring by predicting an exhaust gas oxygen concentration and providing a predicted exhaust gas oxygen concentration as an a priori input to the reconstructing step, wherein responsive to the predicted exhaust gas oxygen concentration, and the sensory output signal provided in said step of measuring, the step of reconstructing provides a constituent gas signal that has an amplitude indicative of the stable chemical concentration of the gas exhausted during the intervals of engine angular rotation corresponding to the exhaust cycles.

55. A method in accordance with claim 54 wherein said step of reconstructing further comprises the step of:

determining an input estimate delay time from the commencement of each of the plurality of exhaust cycles, wherein the step of predicting provides the predicted exhaust gas oxygen concentration to the step of reconstructing coincident with an expiration of the input estimate delay time.

56. A method in accordance with claim 54 further comprising a step of determining a normalized air-fuel ratio dependent on the determined constituent gas signal.

* * * * *

UNITED STATES PATENT AND TRADEMARK OFFICE
CERTIFICATE OF CORRECTION

PATENT NO. : 5,535,135
DATED : July 9, 1996
INVENTOR(S) : Bush et al.

It is certified that error appears in the above-indentified patent and that said Letters Patent is hereby corrected as shown below:

In claim 1, column 28, line 8, after "state estimator", add --signal reconstruction means--.

Signed and Sealed this

Fifth Day of November, 1996

Attest:

BRUCE LEHMAN

Attesting Officer          Commissioner of Patents and Trademarks